(12) United States Patent
Choi et al.

(10) Patent No.: US 12,250,912 B2
(45) Date of Patent: Mar. 18, 2025

(54) PLANT CULTIVATION APPARATUS AND WATER SUPPLY CONTROL METHOD THEREFOR

(71) Applicant: LG ELECTRONICS INC., Seoul (KR)

(72) Inventors: Hoon Seok Choi, Seoul (KR); Tae Yang Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 148 days.

(21) Appl. No.: 17/771,133

(22) PCT Filed: Aug. 13, 2020

(86) PCT No.: PCT/KR2020/010721
§ 371 (c)(1),
(2) Date: Apr. 22, 2022

(87) PCT Pub. No.: WO2021/080140
PCT Pub. Date: Apr. 29, 2021

(65) Prior Publication Data
US 2022/0295714 A1  Sep. 22, 2022

(30) Foreign Application Priority Data
Oct. 22, 2019  (KR) .................. 10-2019-0131343

(51) Int. Cl.
*A01G 9/24*   (2006.01)
*A01G 27/00*  (2006.01)

(52) U.S. Cl.
CPC ........... *A01G 9/247* (2013.01); *A01G 27/003* (2013.01); *A01G 27/008* (2013.01)

(58) Field of Classification Search
CPC .... A01G 27/003; A01G 27/008; A01G 9/247; A01G 31/06
See application file for complete search history.

(56) References Cited

U.S. PATENT DOCUMENTS

| | | | |
|---|---|---|---|
| 10,136,592 B2 * | 11/2018 | Broutin Farah | ....... A01G 31/00 |
| 2012/0297675 A1 | 11/2012 | Hashimoto et al. | |
| 2015/0007495 A1 | 1/2015 | Tseng et al. | |

(Continued)

FOREIGN PATENT DOCUMENTS

| | | |
|---|---|---|
| CN | 103975839 | 8/2014 |
| CN | 103416292 | 7/2015 |

(Continued)

OTHER PUBLICATIONS

European Search Report dated Oct. 20, 2023 issued in Application No. 20878646.7.

(Continued)

*Primary Examiner* — Brady W Frazier
*Assistant Examiner* — Alanna K Peterson
(74) *Attorney, Agent, or Firm* — KED & ASSOCIATES, LLP

(57) ABSTRACT

A plant cultivation apparatus and a method for controlling water supply in the plant cultivation apparatus are provided. The plant cultivation apparatus may supply feed water to a bed according to whether or not the feed water supplied to the bed to cultivate plants remains to prevent the feed water from being supplied more than necessary.

8 Claims, 24 Drawing Sheets

(56) References Cited

U.S. PATENT DOCUMENTS

| | | | |
|---|---|---|---|
| 2016/0029574 A1 | 2/2016 | He et al. | |
| 2018/0325038 A1 | 11/2018 | Spiro | |
| 2018/0372624 A1 | 12/2018 | Fujiyama et al. | |
| 2019/0183062 A1* | 6/2019 | Pham | A01G 9/022 |
| 2019/0191643 A1* | 6/2019 | Chan | H05B 45/10 |
| 2020/0084983 A1* | 3/2020 | Liang | B01D 46/46 |

FOREIGN PATENT DOCUMENTS

| | | |
|---|---|---|
| KR | 20-0157461 | 9/1999 |
| KR | 10-1088427 | 12/2011 |
| KR | 10-2012-0007420 | 1/2012 |
| KR | 10-2012-0028040 | 3/2012 |
| KR | 20-0465385 | 2/2013 |
| KR | 10-1240375 | 3/2013 |
| KR | 20-0467246 | 6/2013 |
| KR | 10-2013-0078394 | 7/2013 |
| KR | 10-1342141 | 12/2013 |
| KR | 10-1400375 | 6/2014 |
| KR | 10-1422636 | 7/2014 |
| KR | 10-1820408 | 1/2018 |

OTHER PUBLICATIONS

Extended European Search Report dated Jan. 23, 2024 issued in Application No. 20878646.7.
International Search Report and Written Opinion dated Nov. 19, 2020 issued in PCT Application No. PCT/KR2020/010721.
Korean Office Action dated Oct. 31, 2024 issued in Application No. 10-2019-0131343.

* cited by examiner

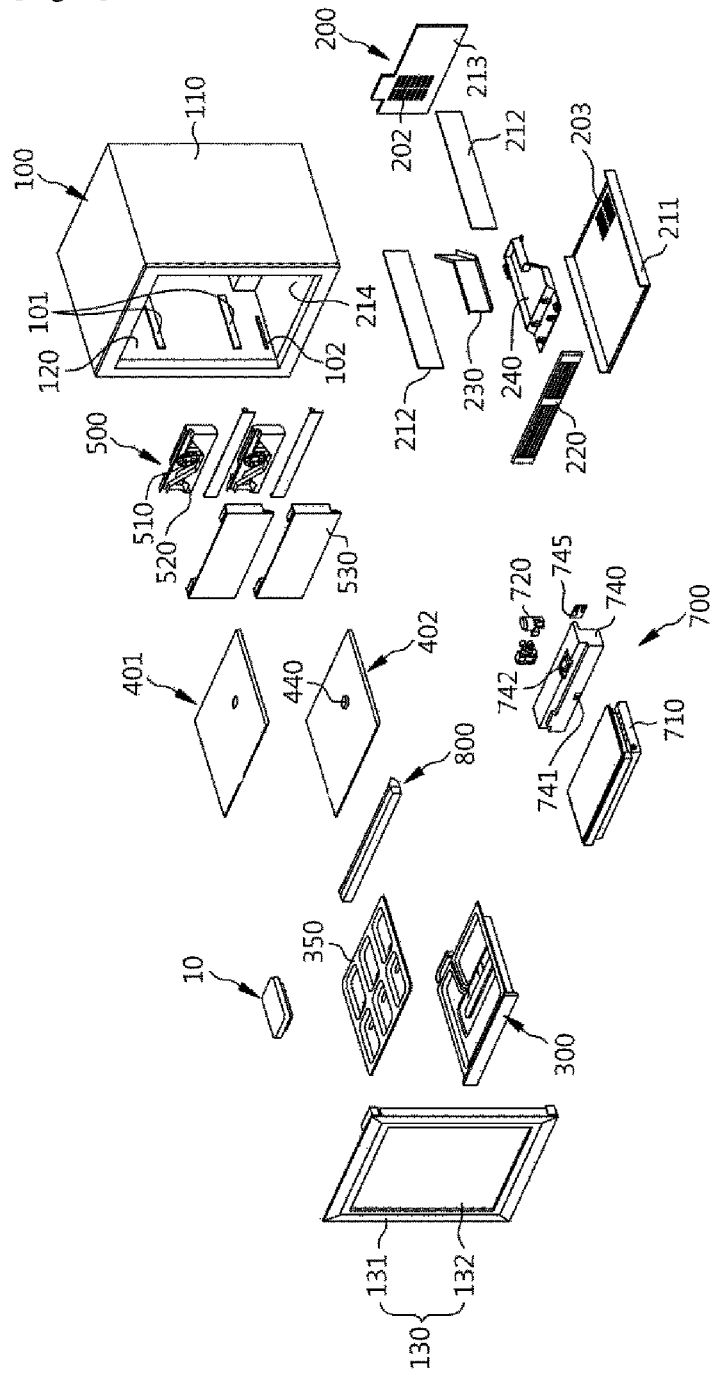

[Fig. 2]
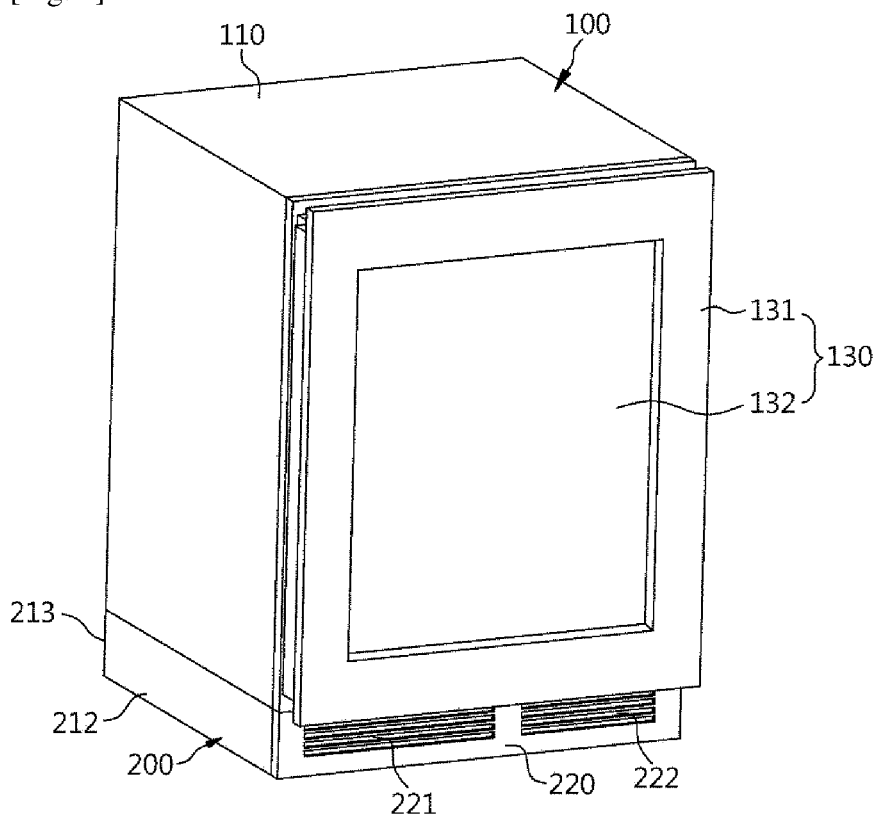
[Fig. 3]
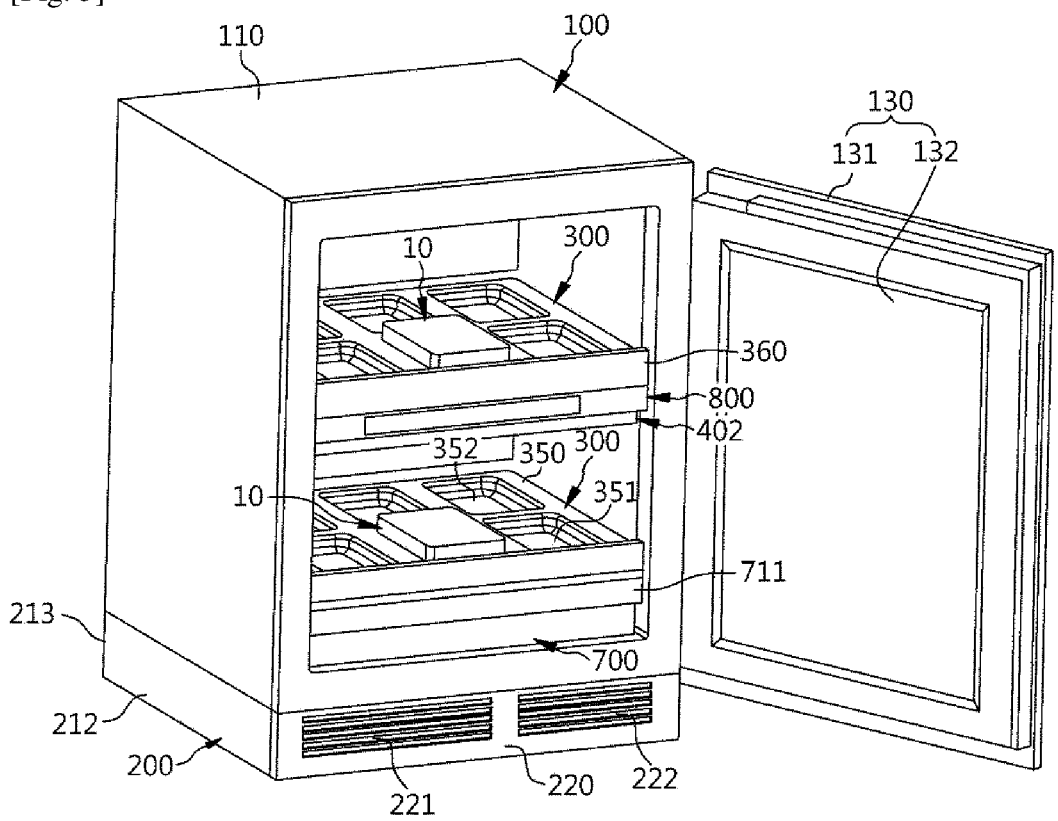

[Fig. 4]
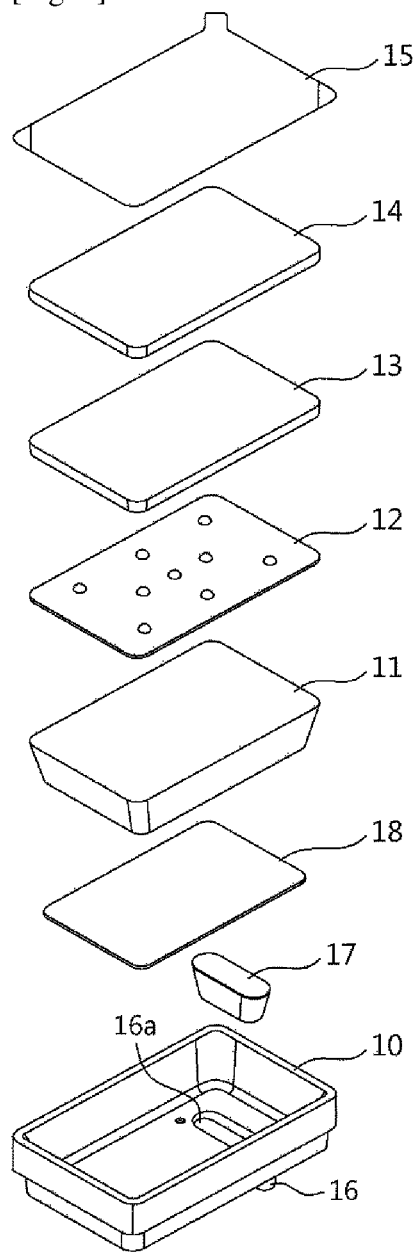
[Fig. 5]
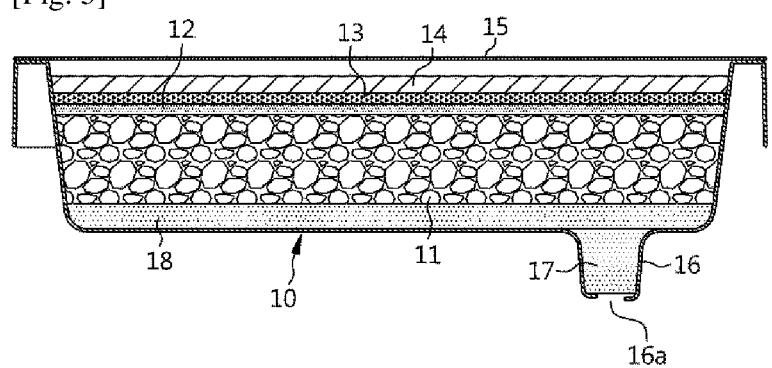

[Fig. 6]
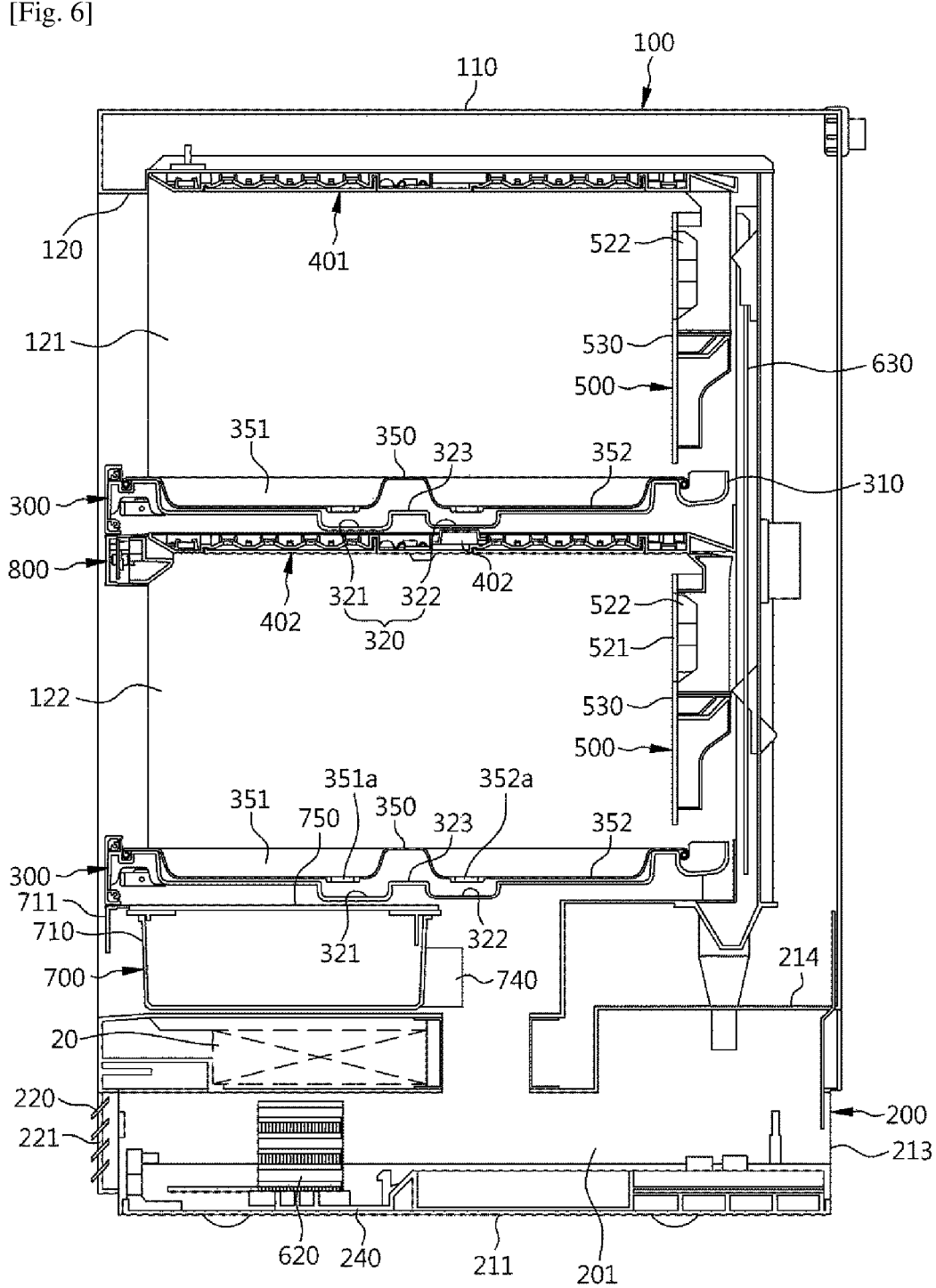

[Fig. 7]
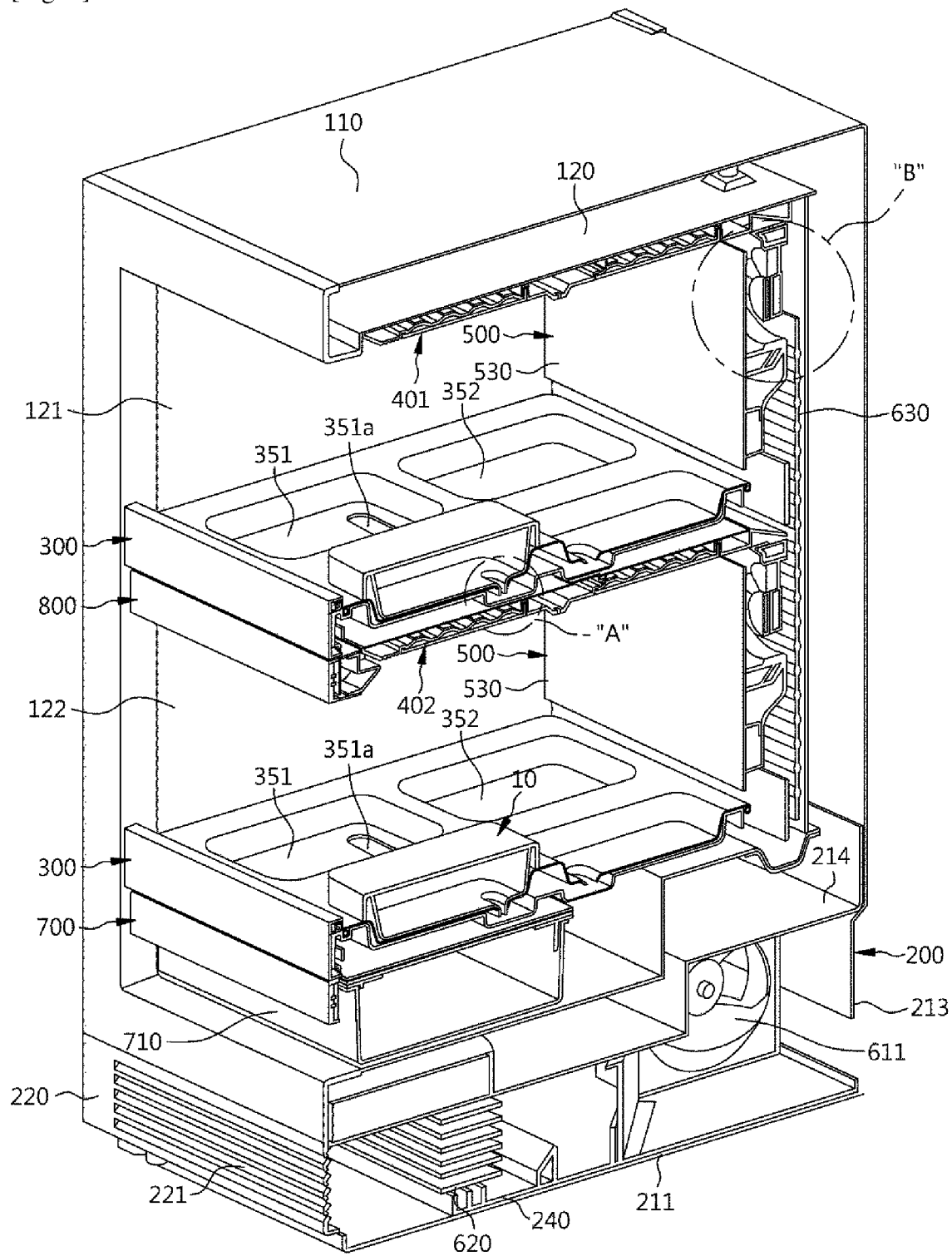

[Fig. 8]
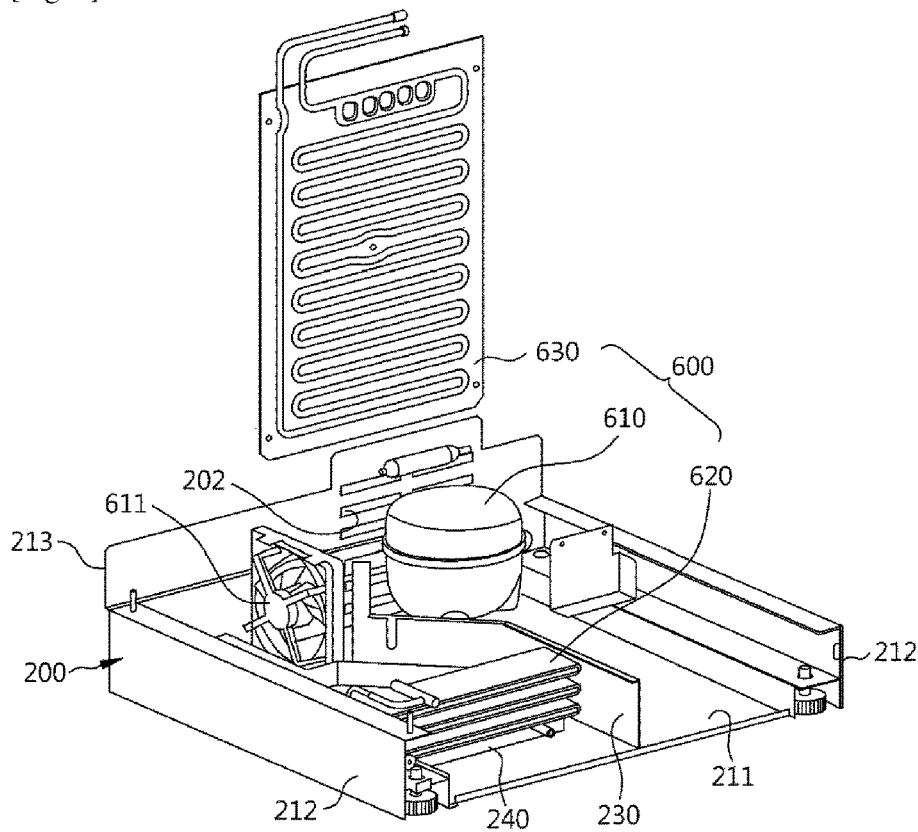
[Fig. 9]
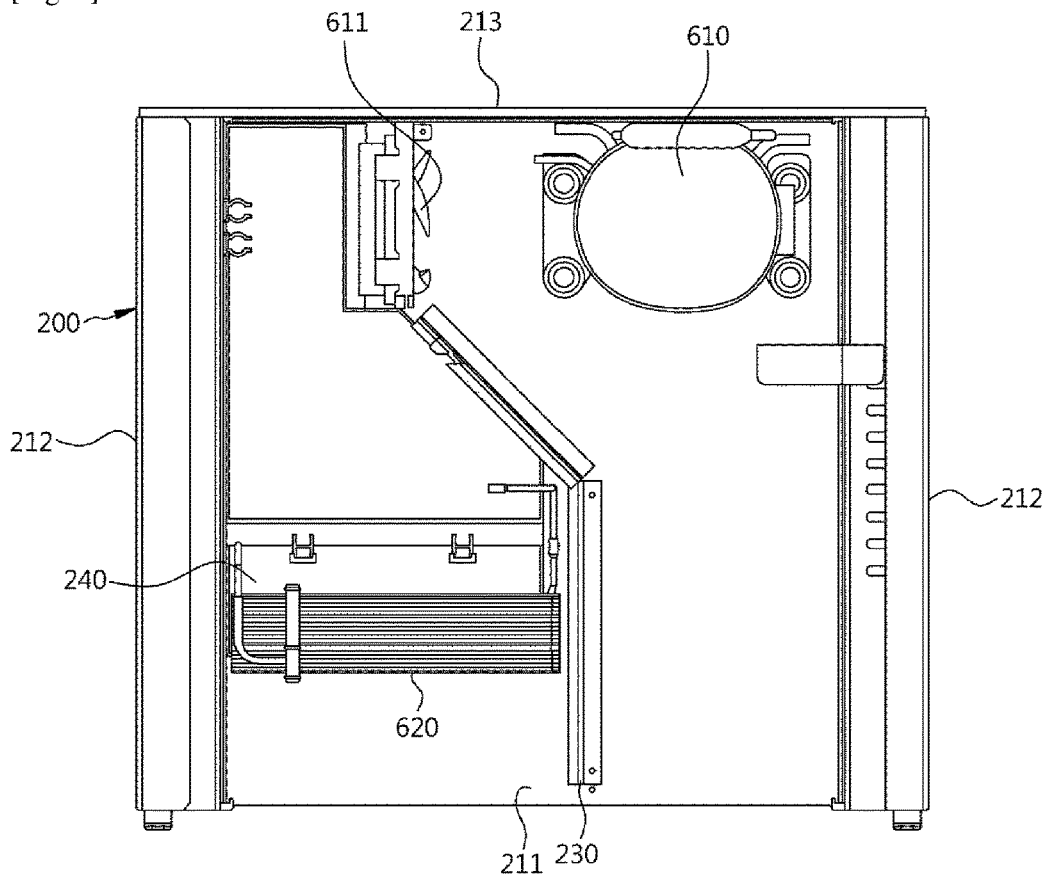

[Fig. 10]
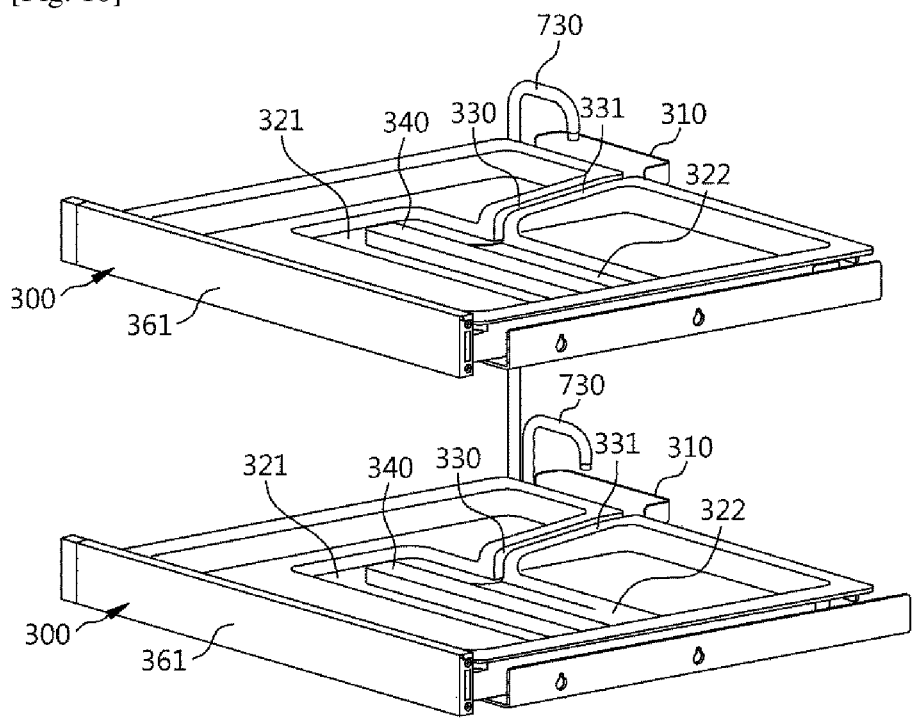
[Fig. 11]
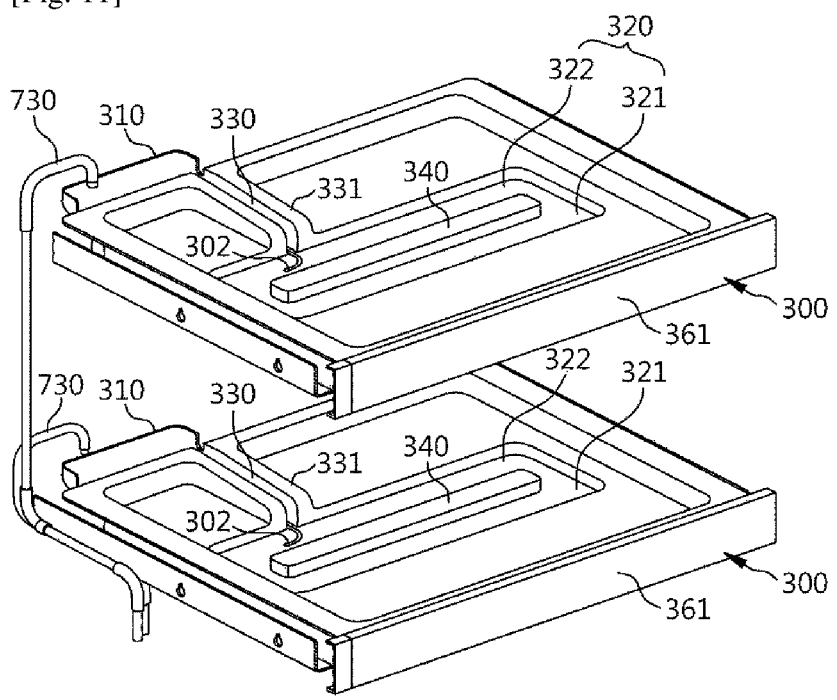

[Fig. 12]
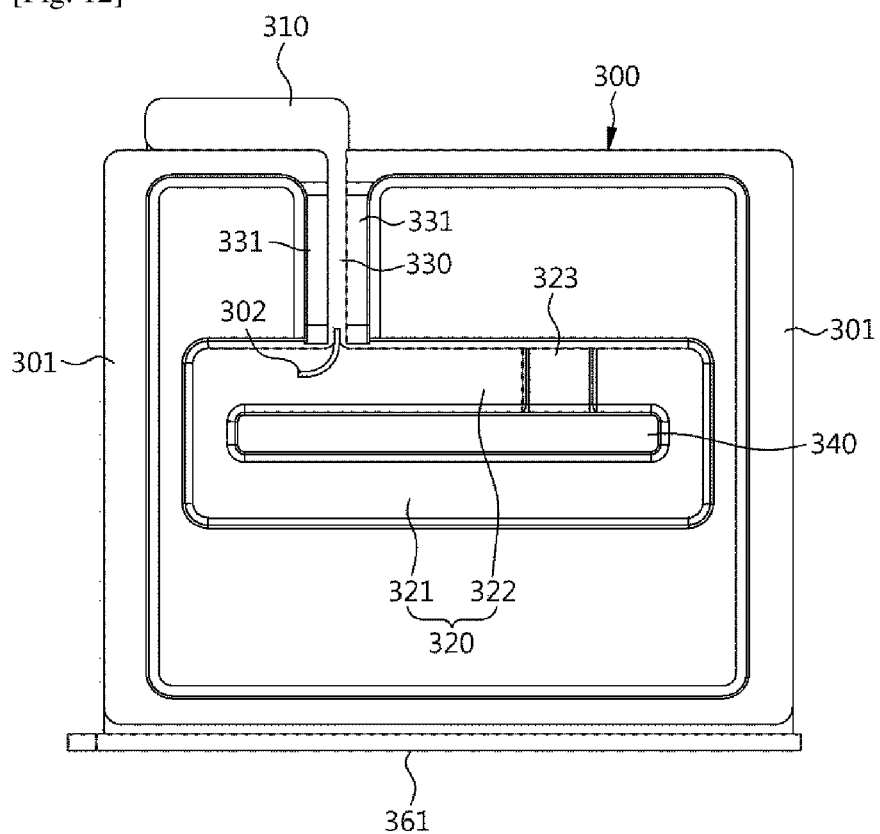
[Fig. 13]
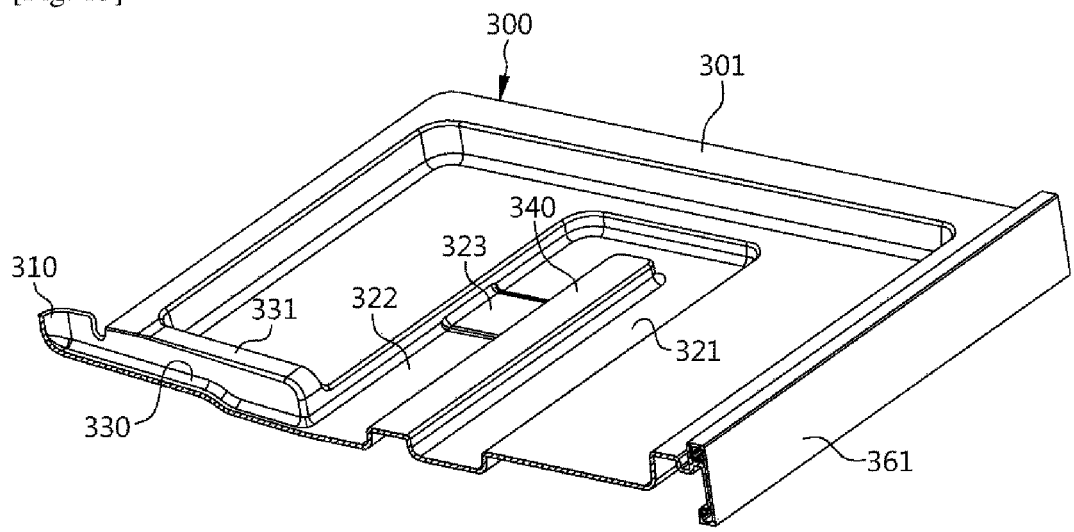
[Fig. 14]
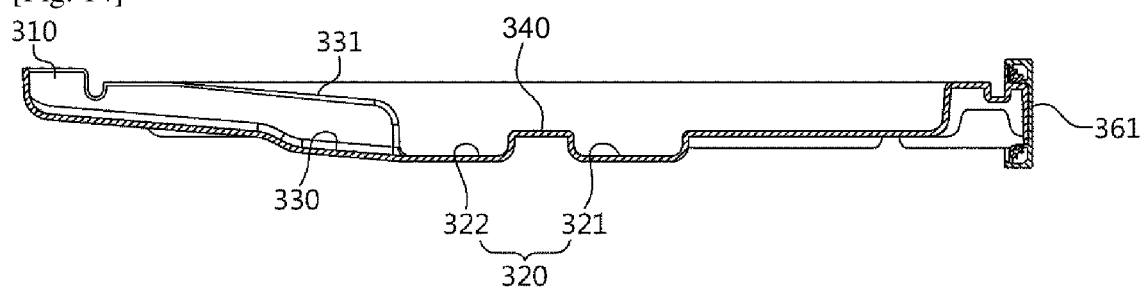

[Fig. 15]
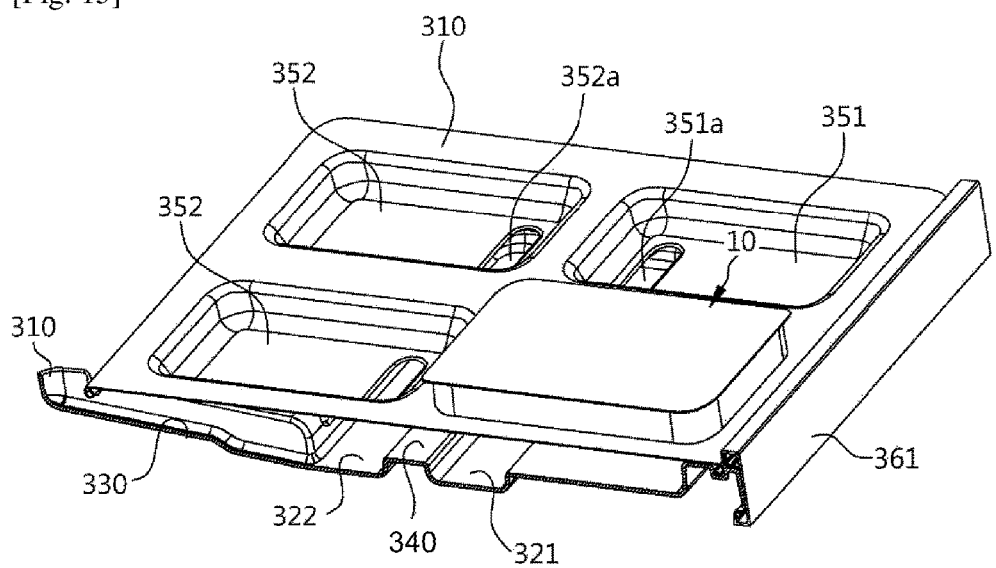
[Fig. 16]
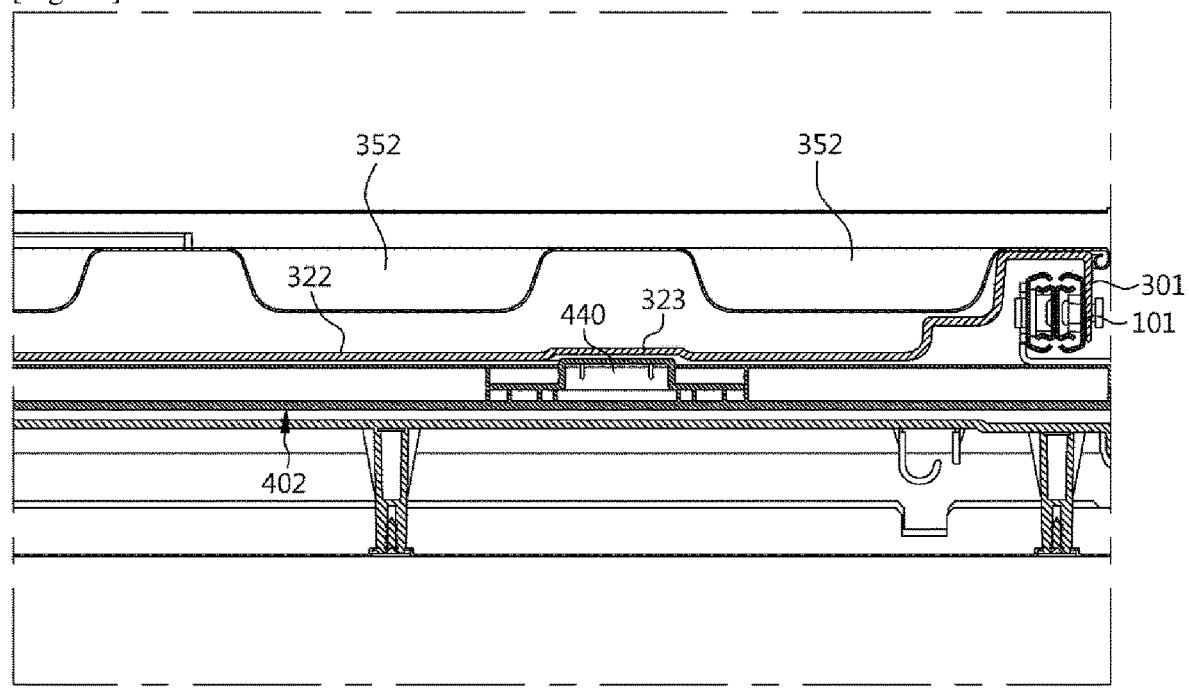

[Fig. 17]
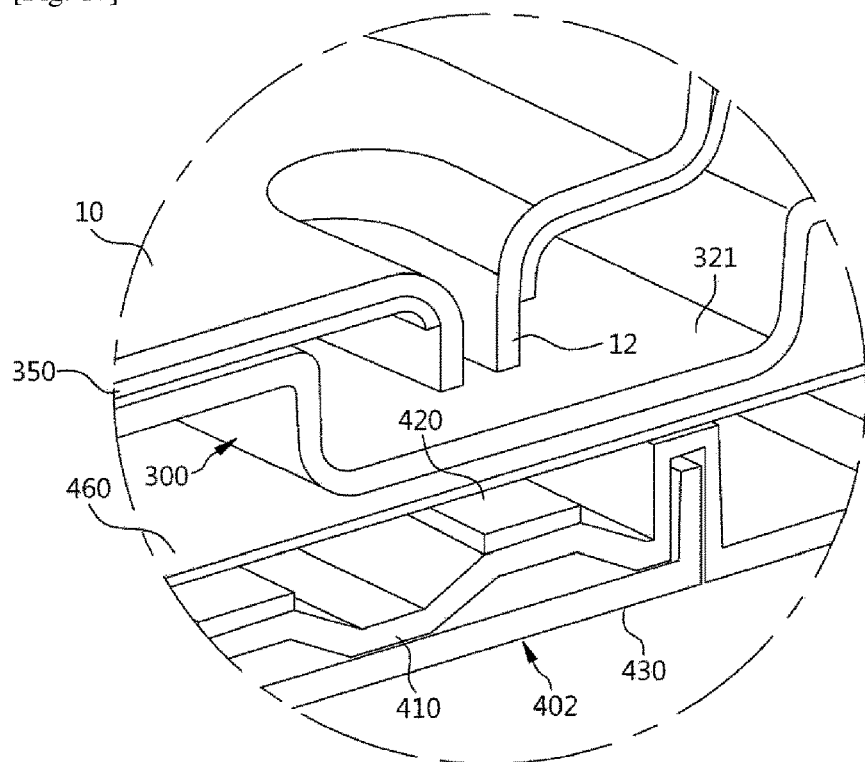
[Fig. 18]
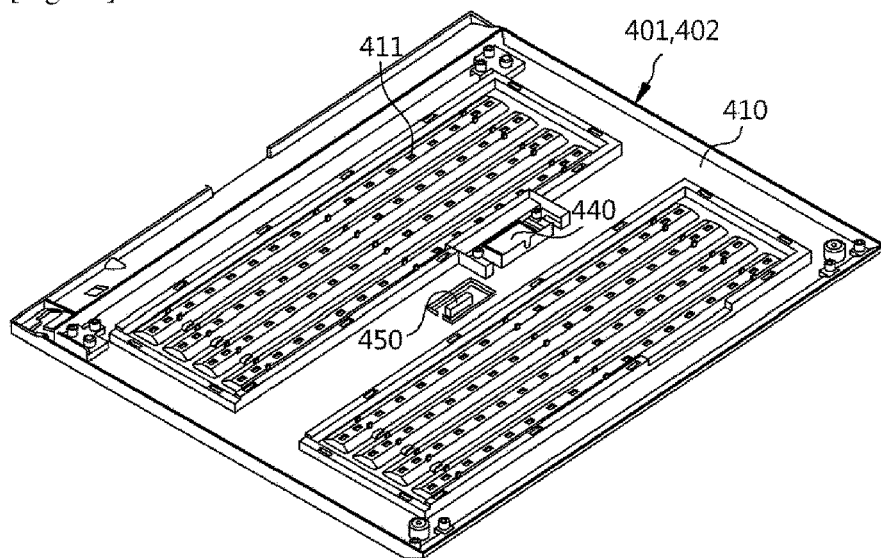
[Fig. 19]
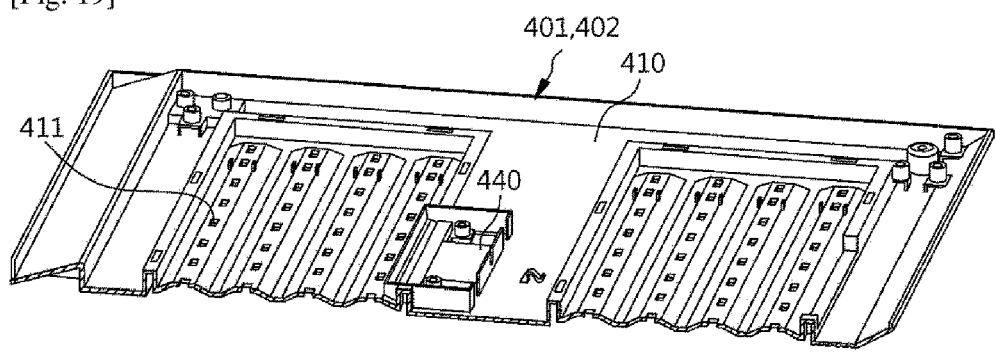

[Fig. 20]
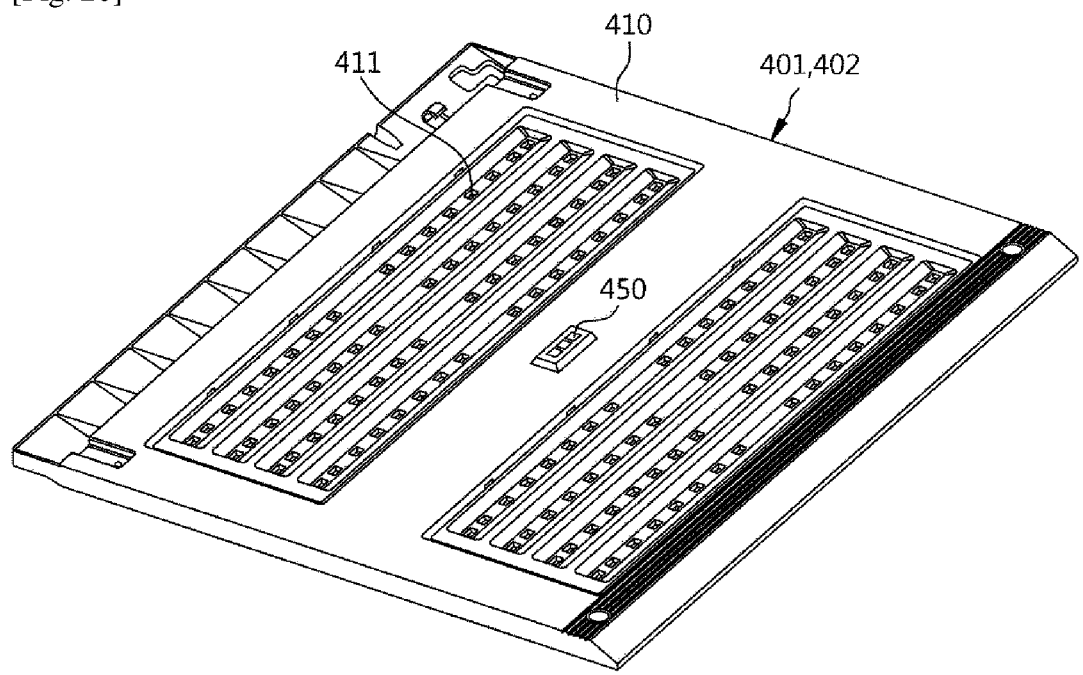
[Fig. 21]
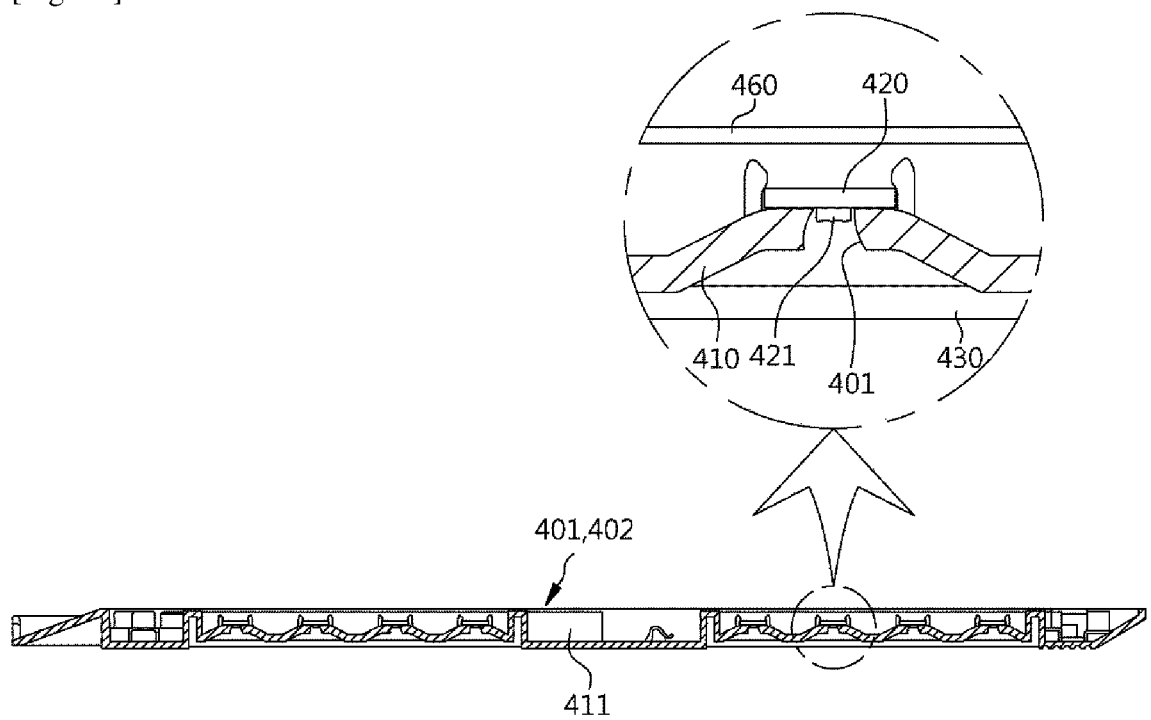

[Fig. 22]
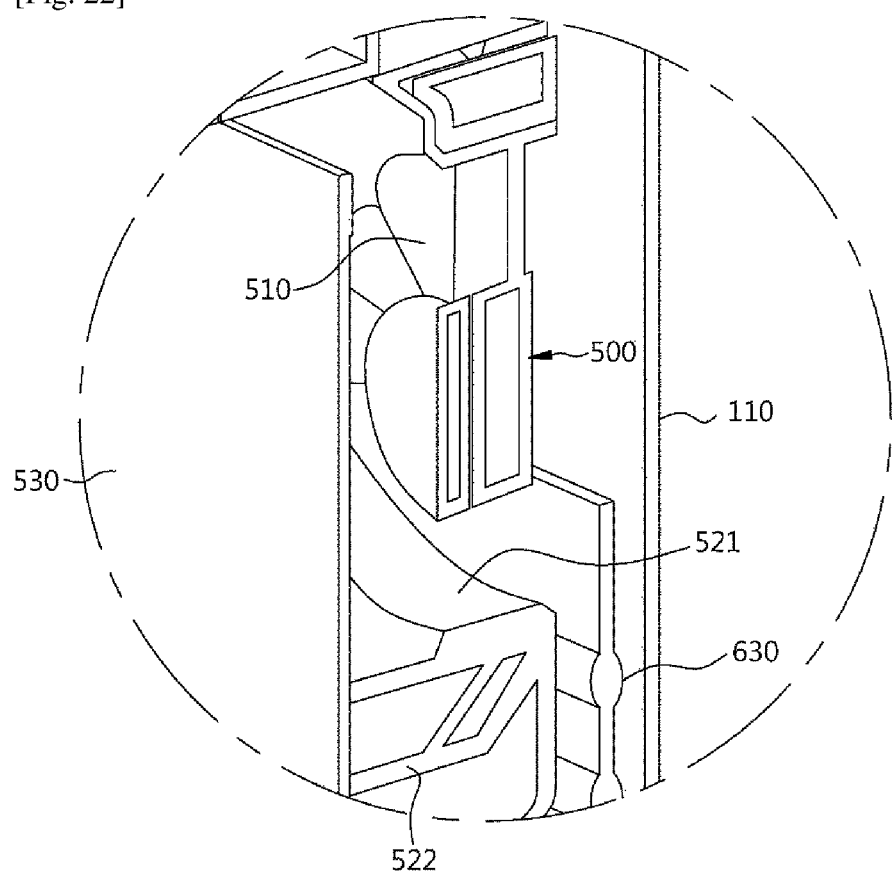
[Fig. 23]
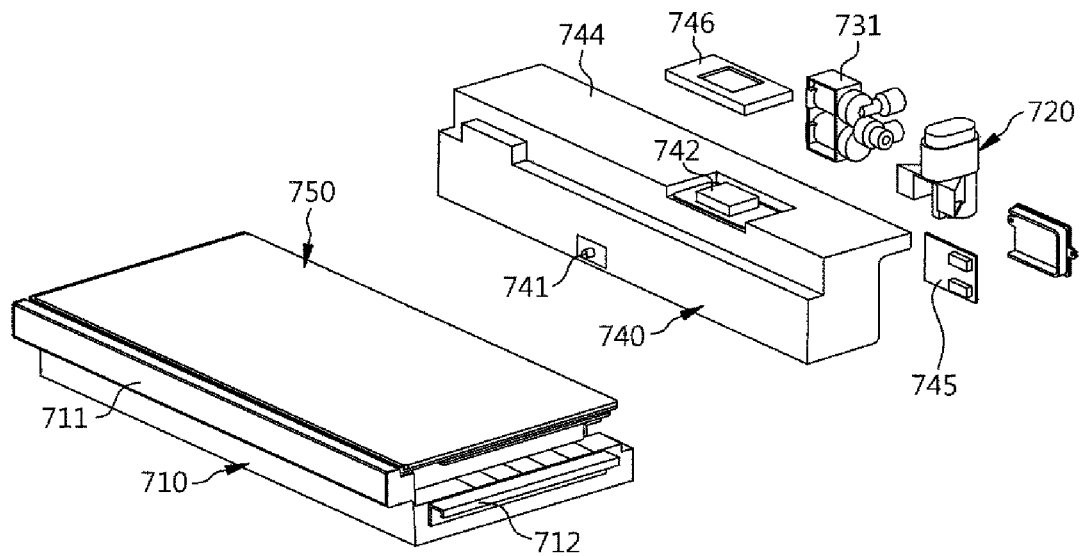

[Fig. 24]
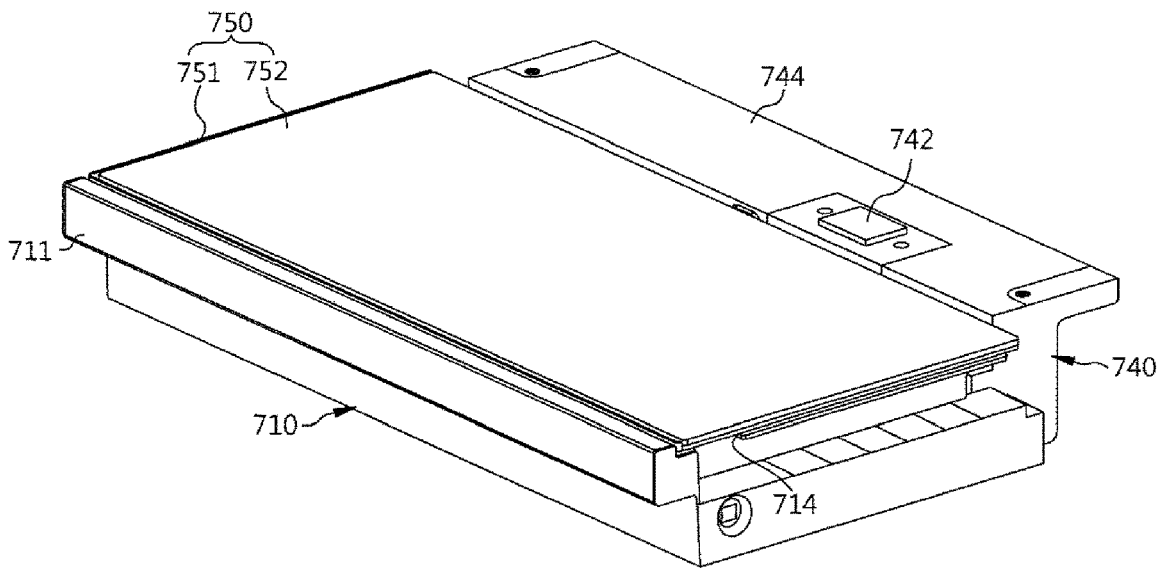
[Fig. 25]
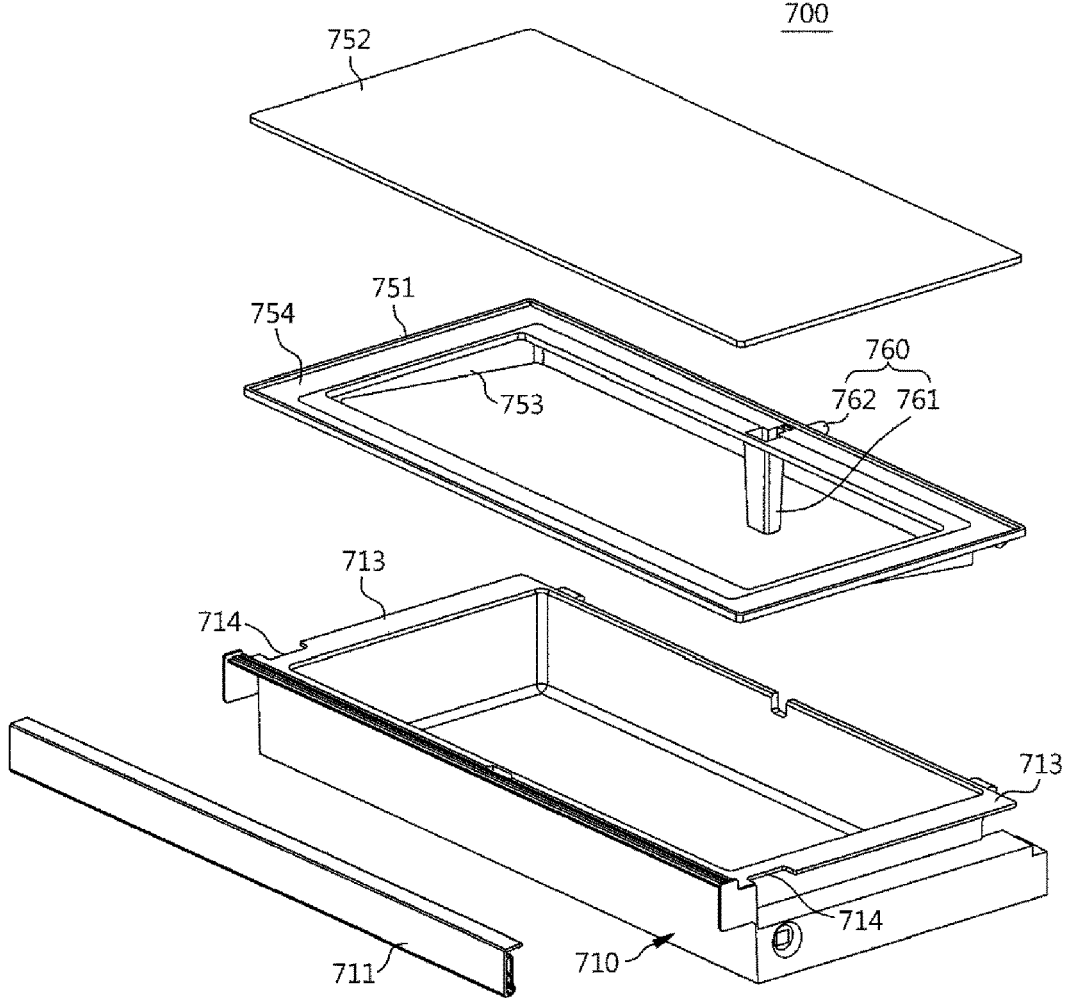

[Fig. 26]
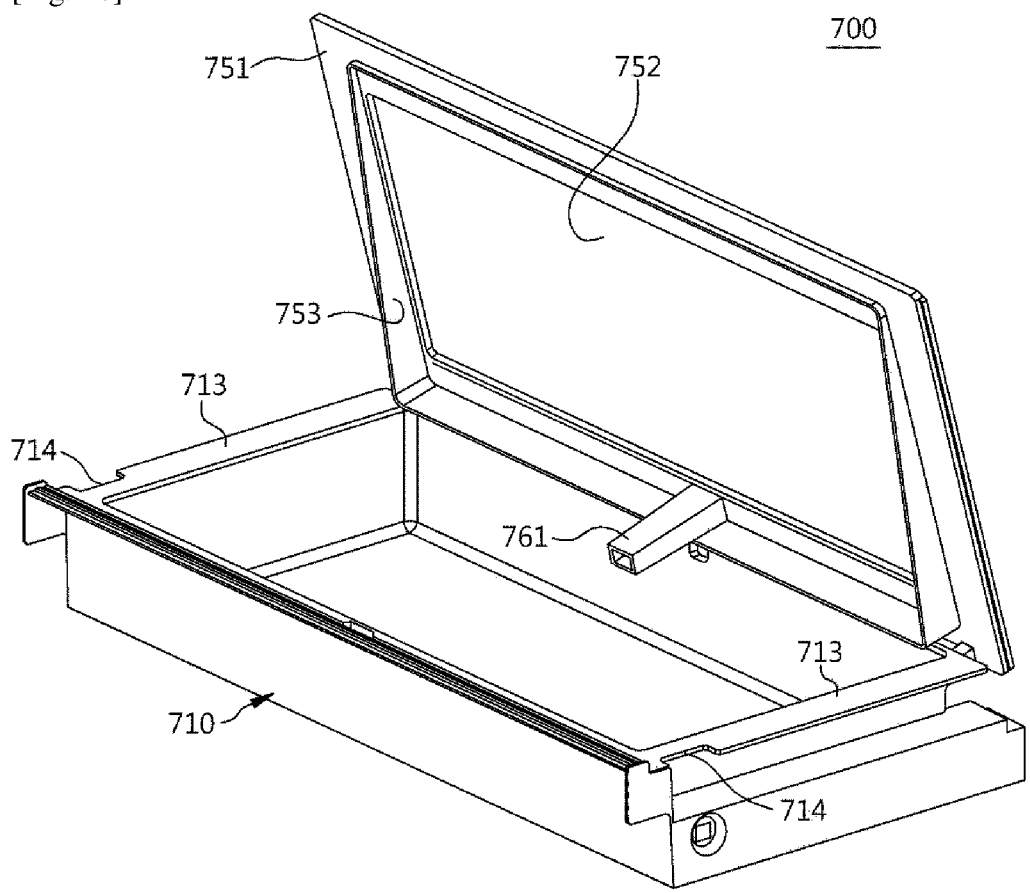
[Fig. 27]
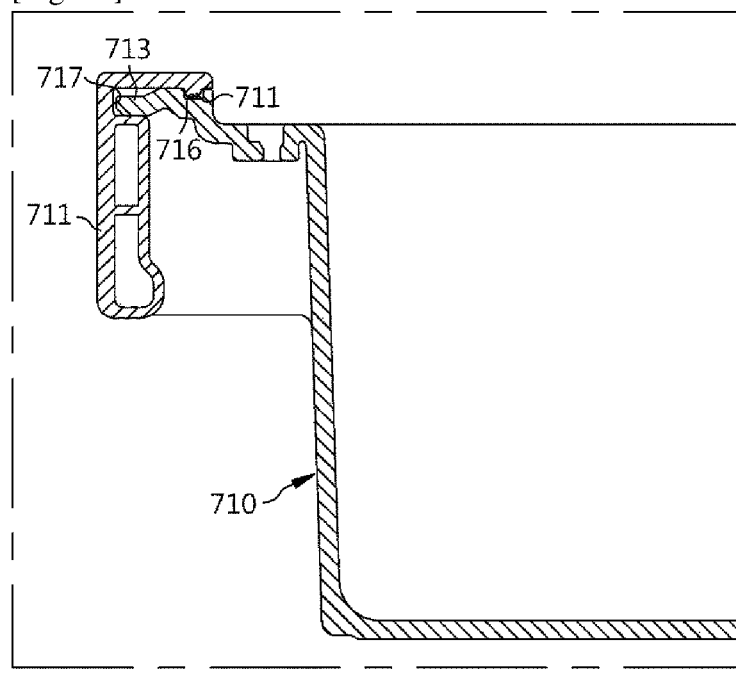

[Fig. 28]
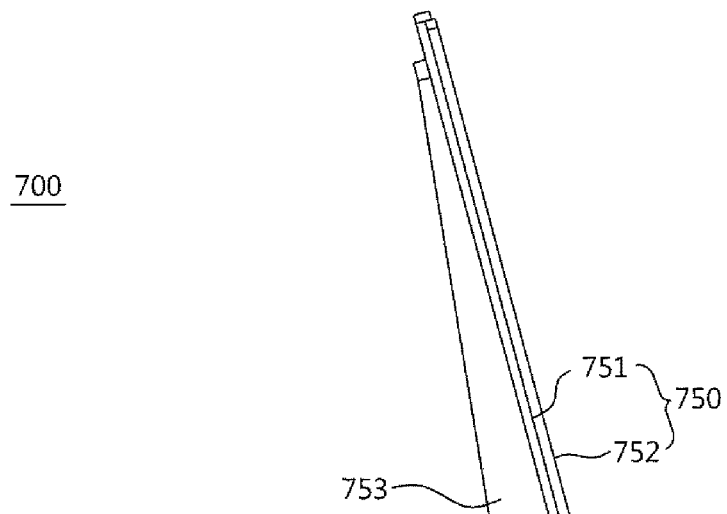
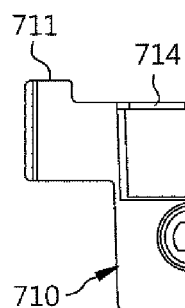
[Fig. 29]
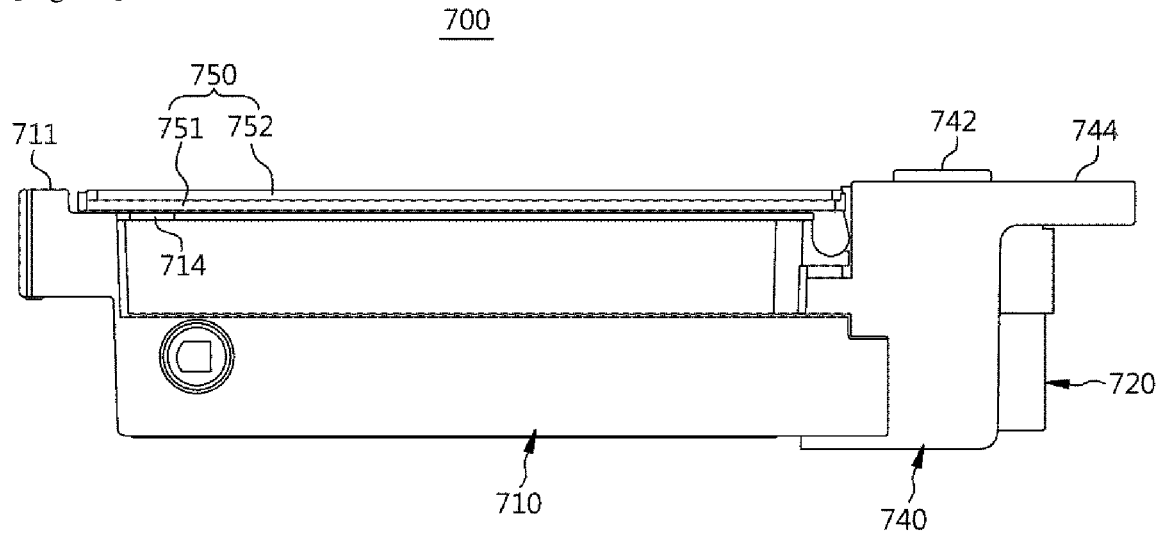

[Fig. 30]
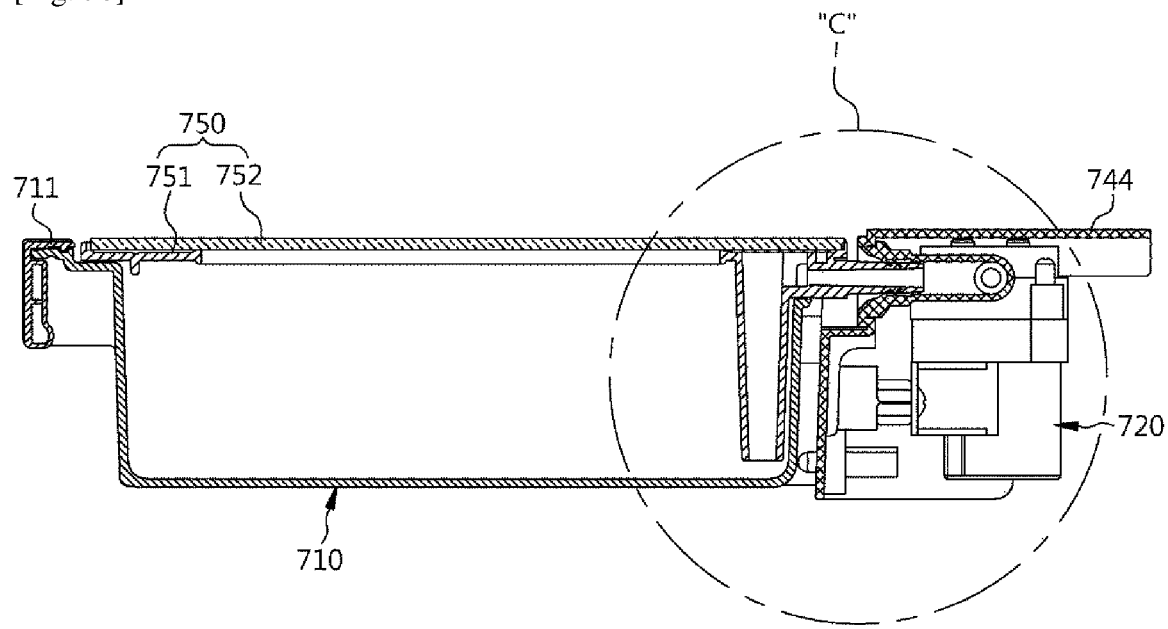
[Fig. 31]
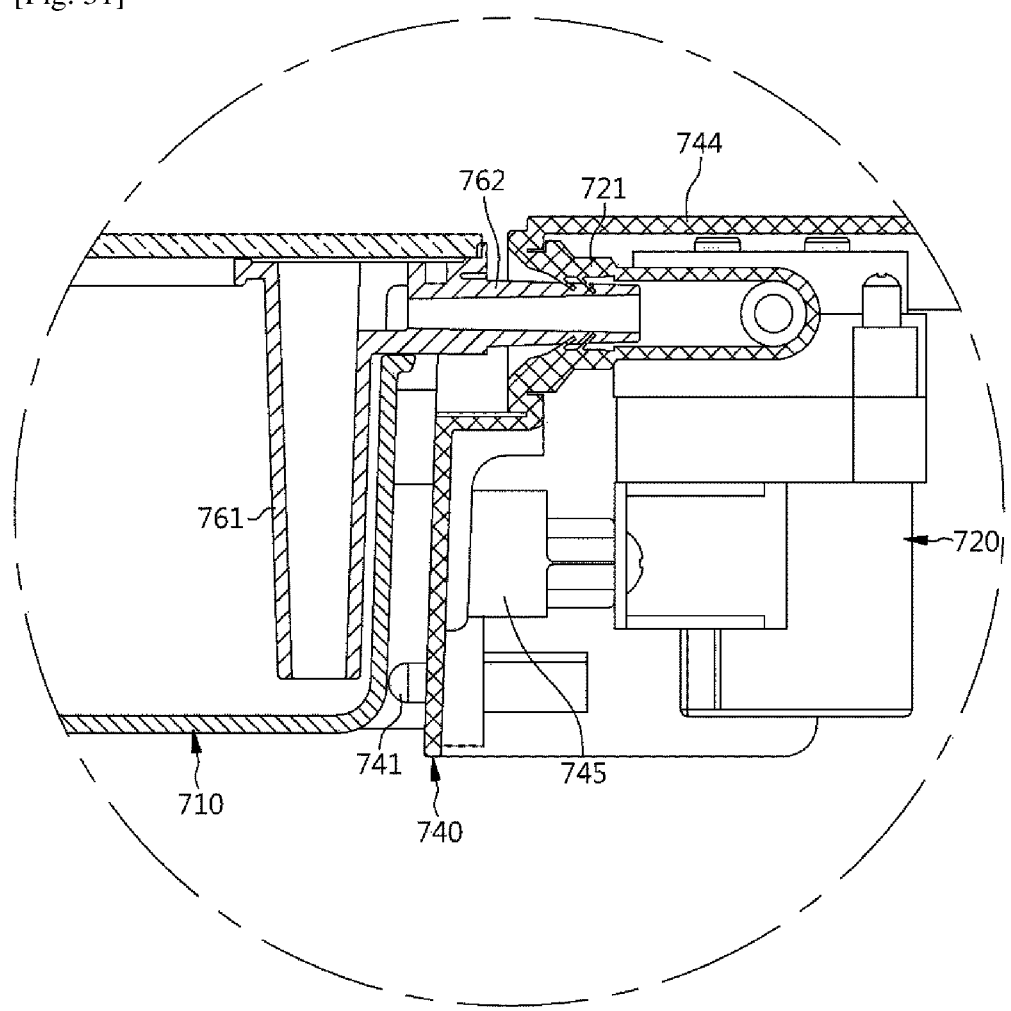

[Fig. 32]
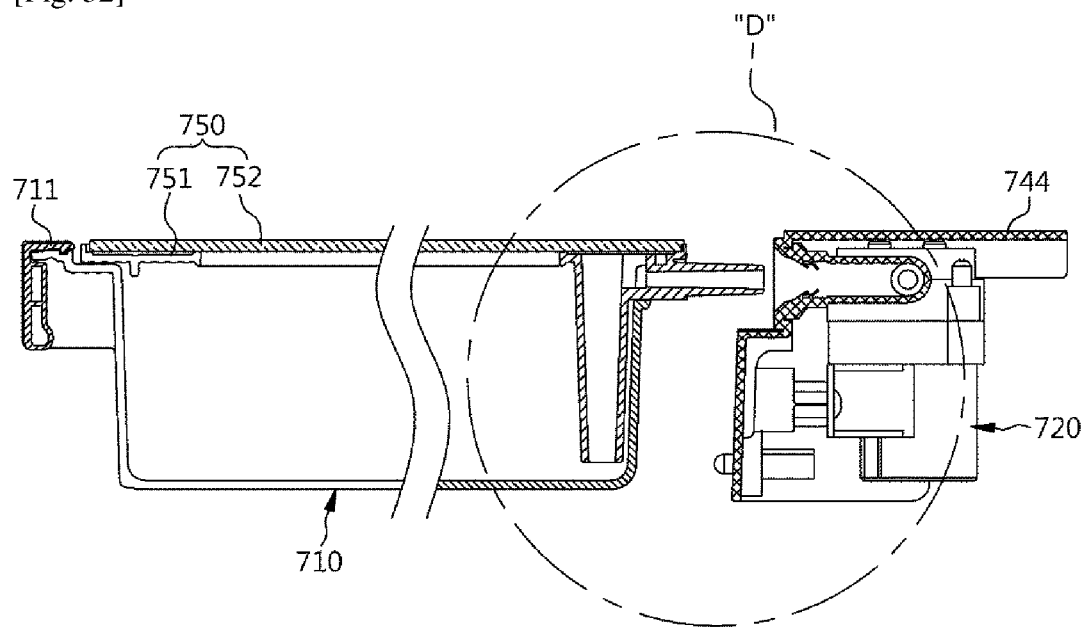
[Fig. 33]
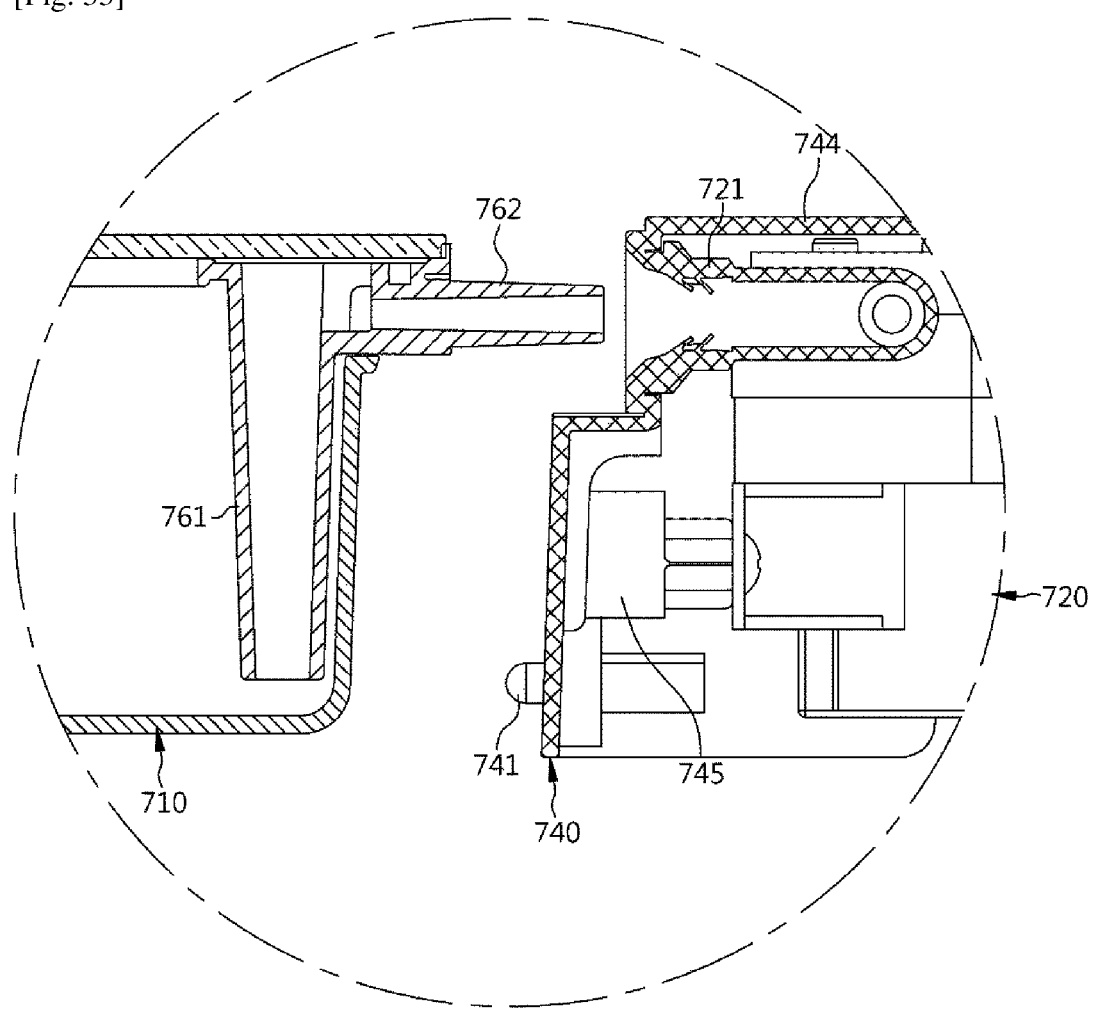

[Fig. 34]
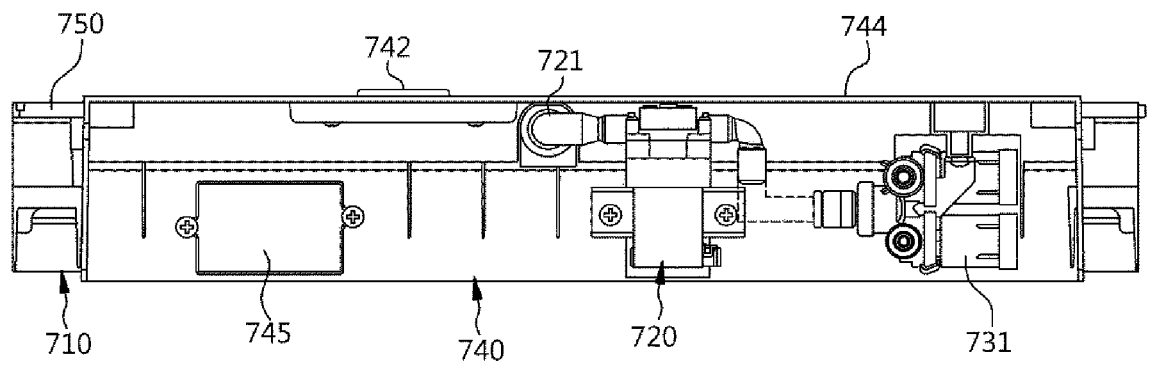
[Fig. 35]
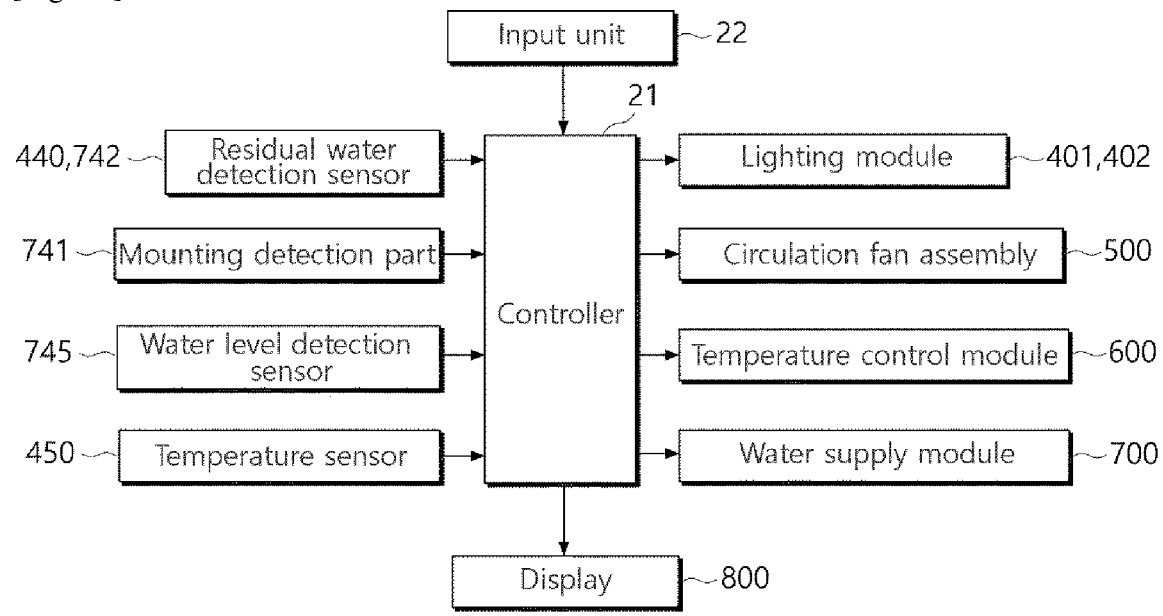

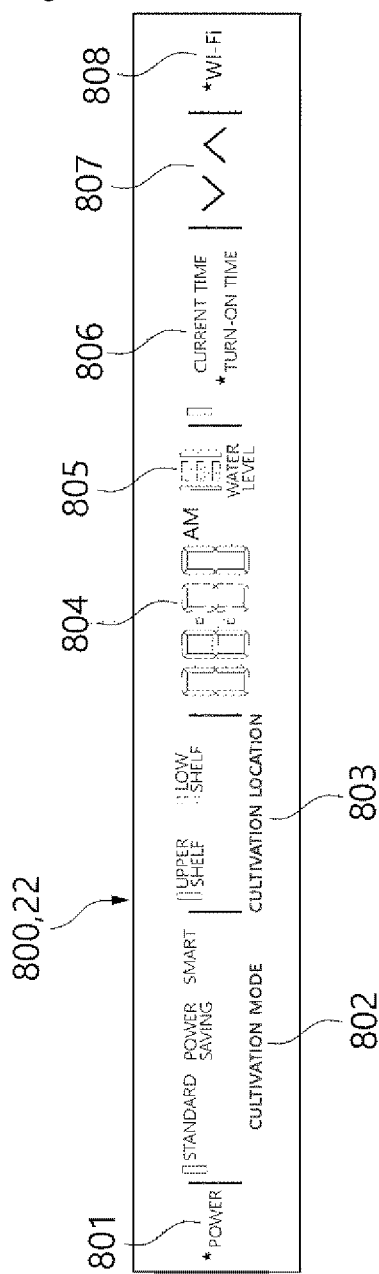
[Fig. 36]

[Fig. 37]
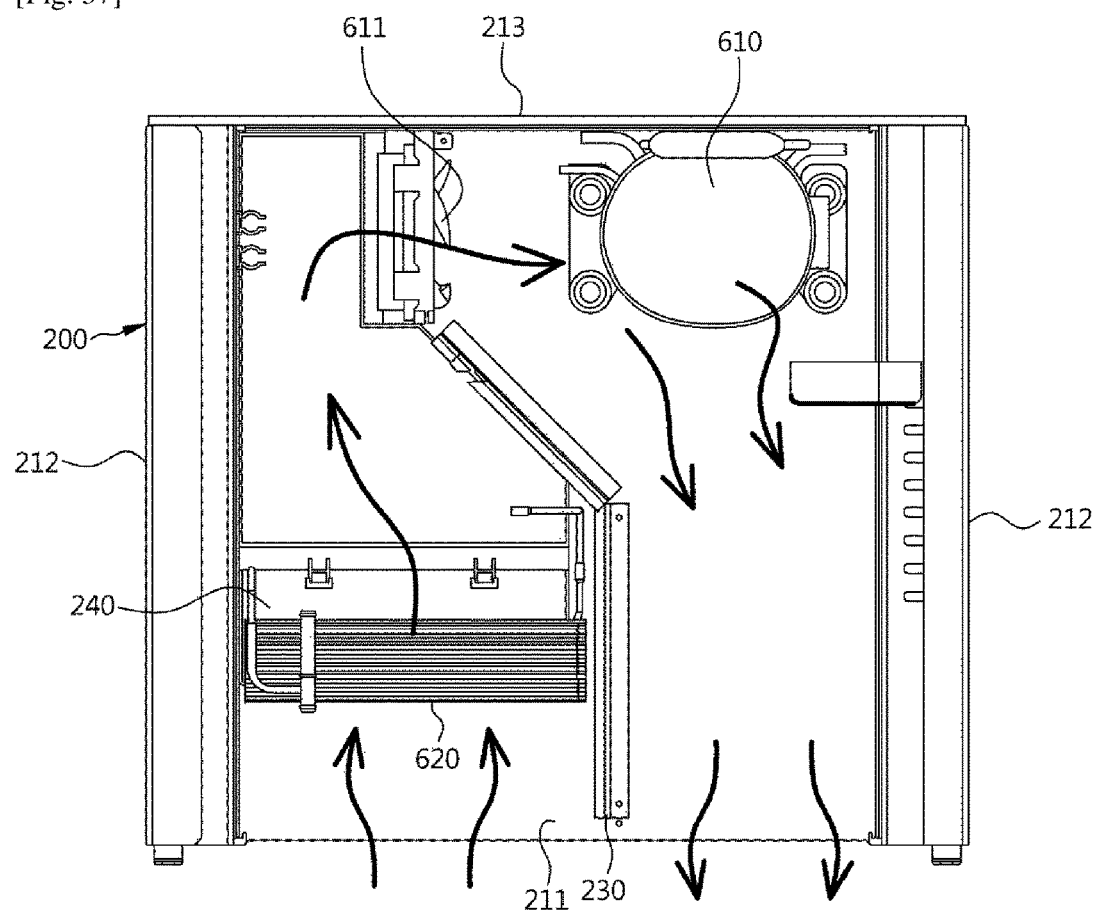
[Fig. 38]
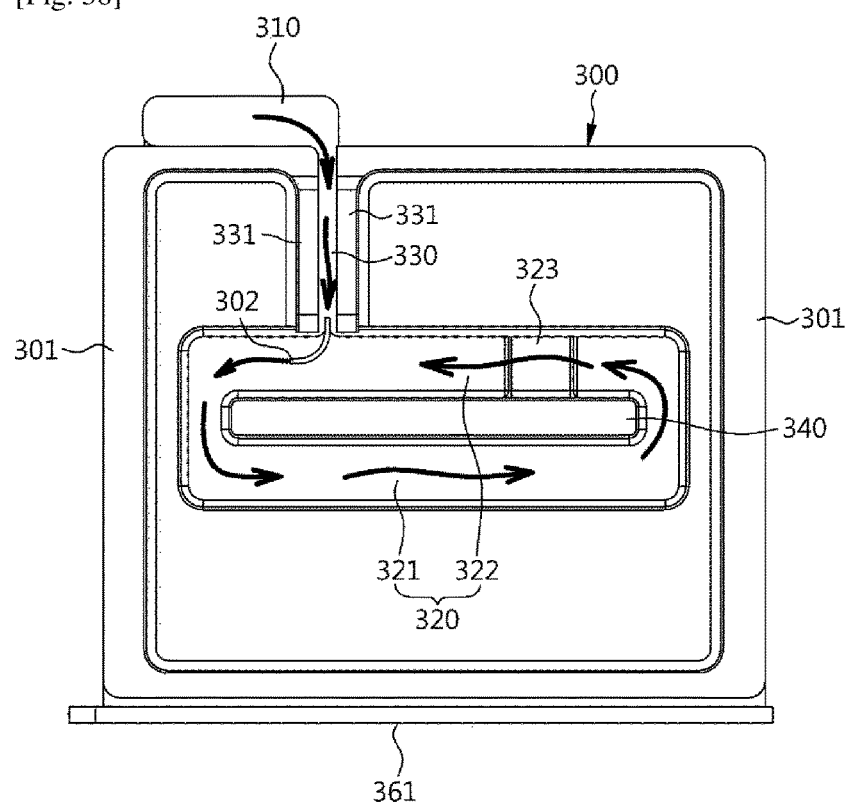

[Fig. 39]
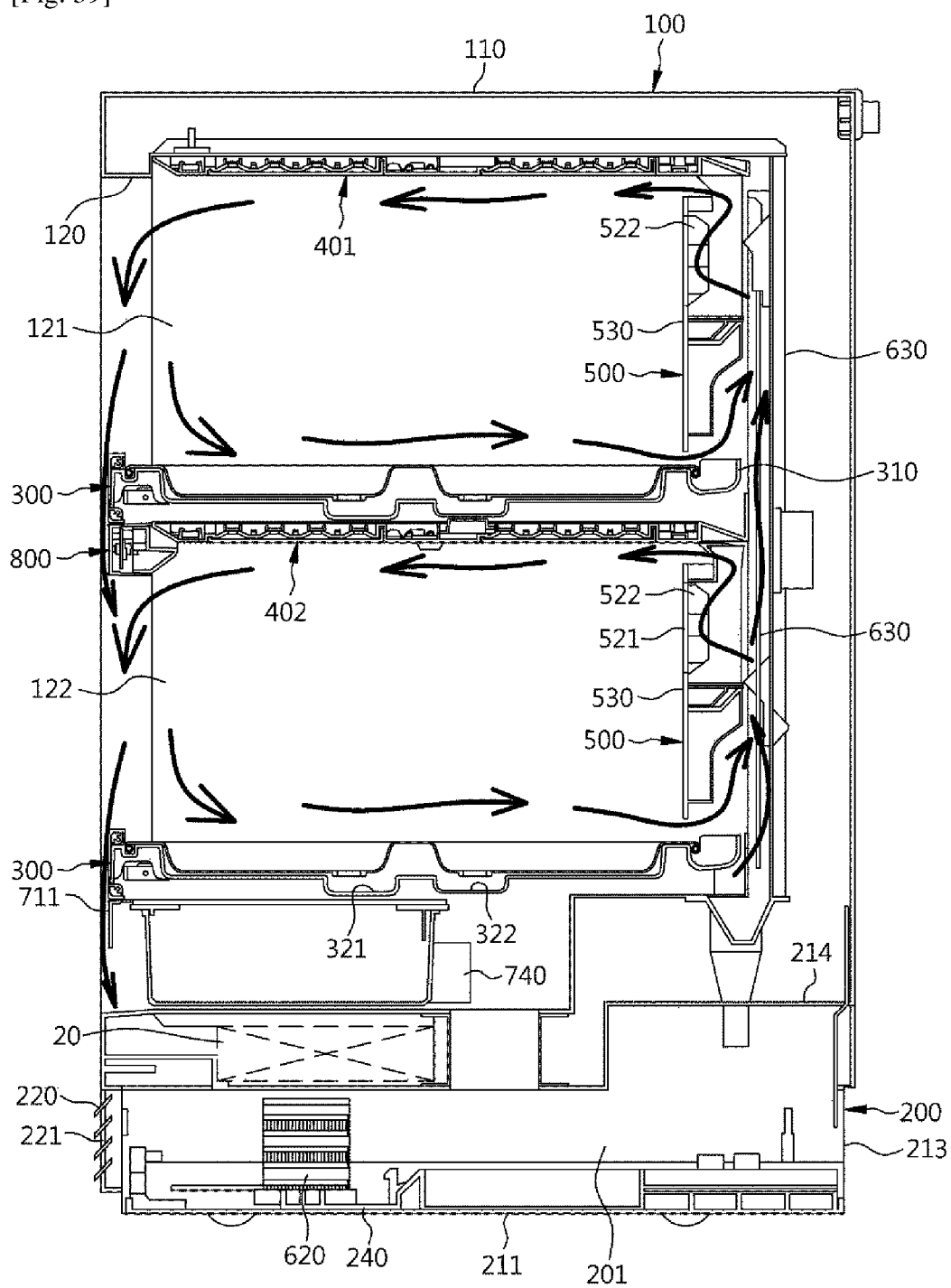

[Fig. 40]
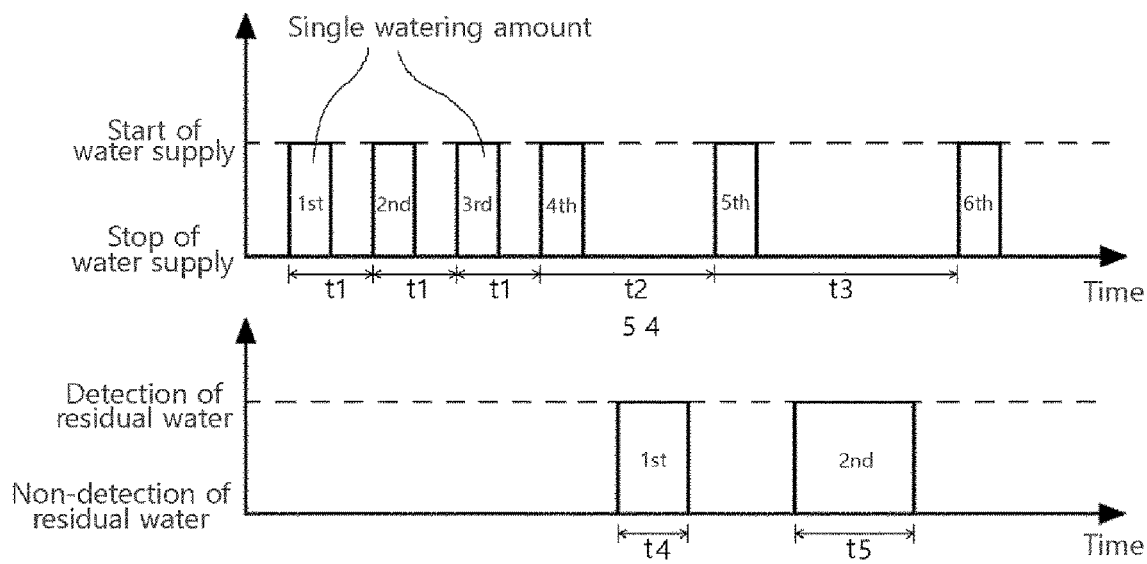
[Fig. 41]
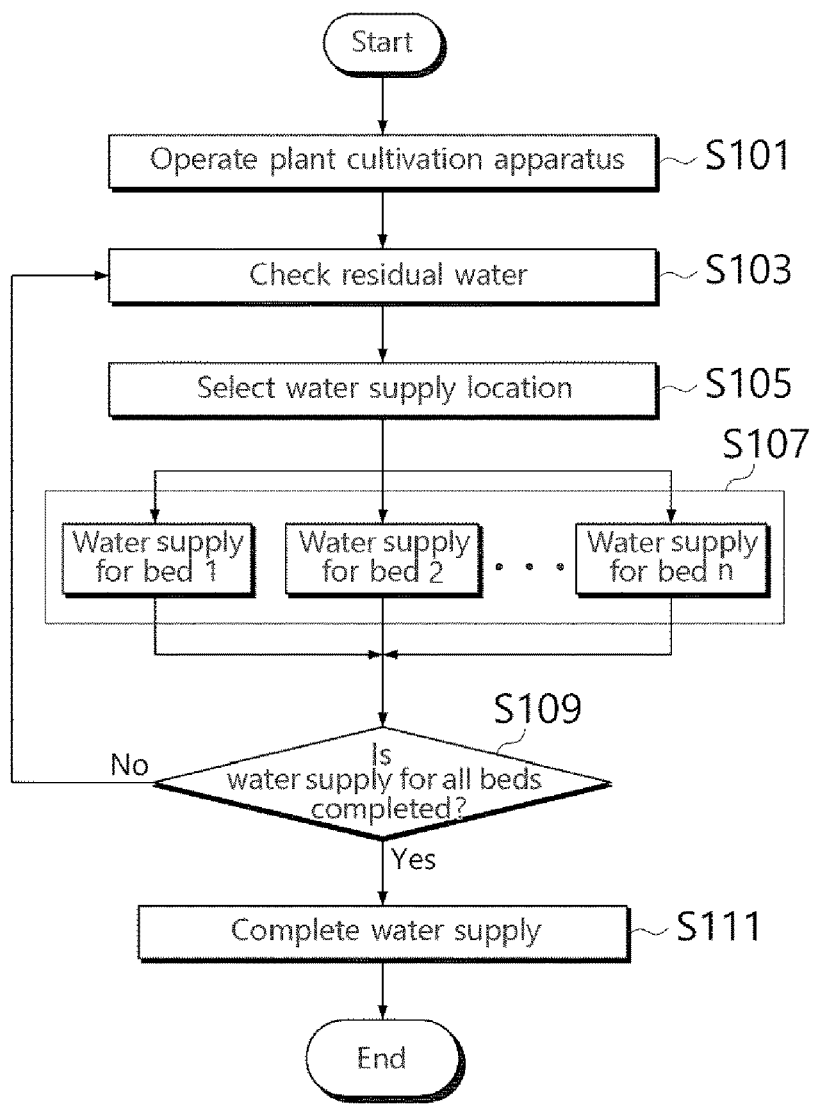

[Fig. 42]
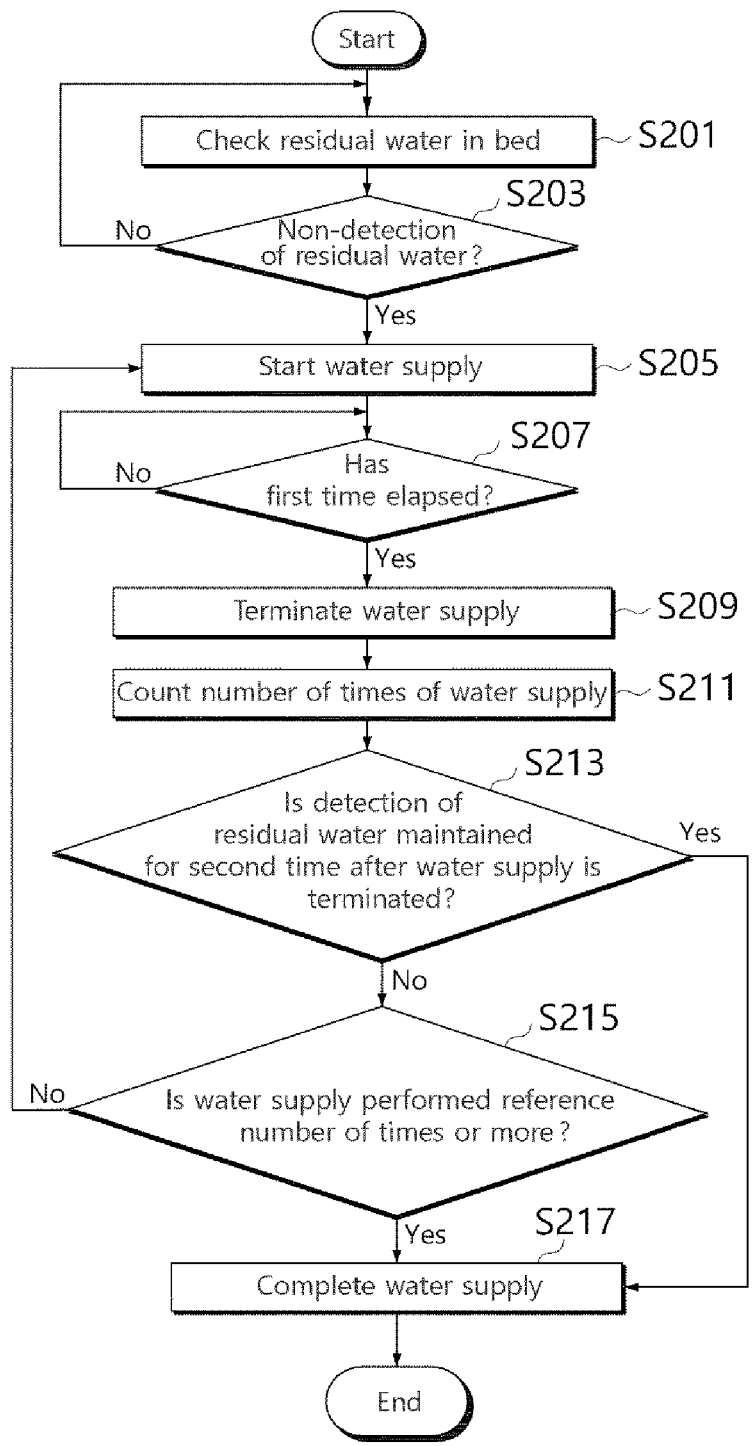

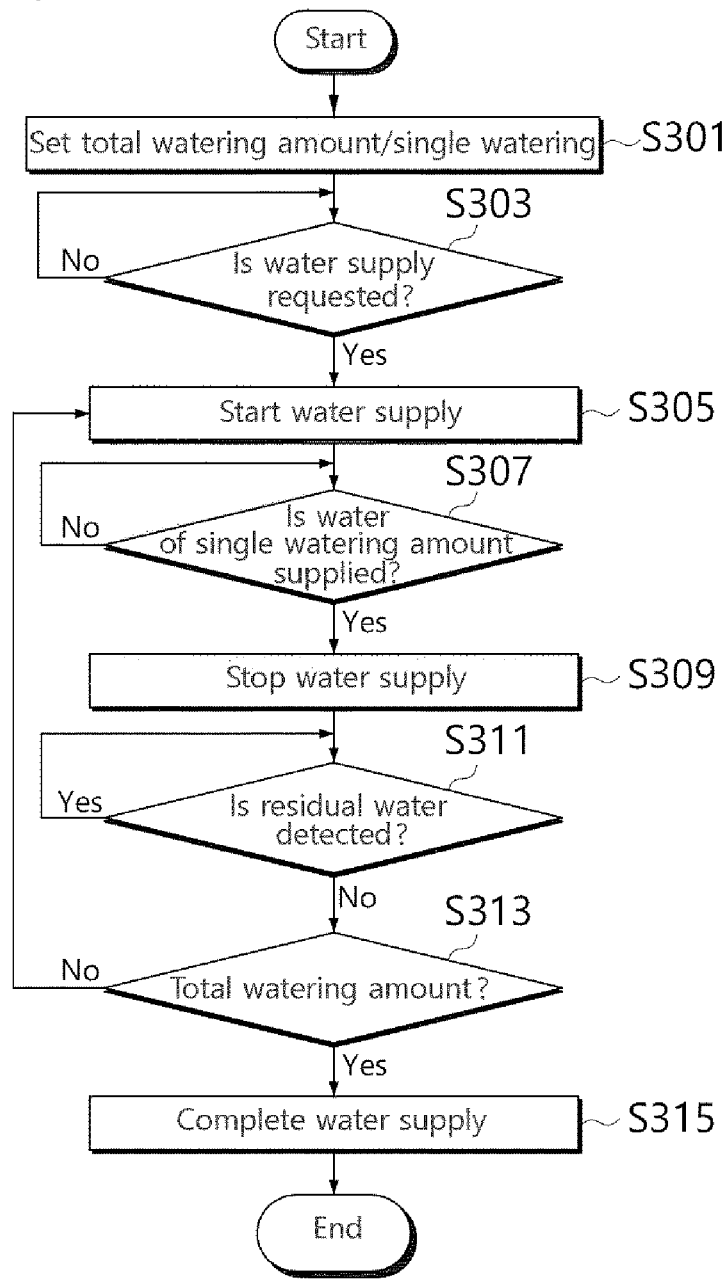
[Fig. 43]

PLANT CULTIVATION APPARATUS AND WATER SUPPLY CONTROL METHOD THEREFOR

CROSS-REFERENCE TO RELATED PATENT APPLICATIONS

This application is a U.S. National Stage Application under 35 U.S.C. § 371 of PCT Application No. PCT/KR2020/010721, filed Aug. 13, 2020, which claims priority to Korean Patent Application No. 10-2019-0131343, filed Oct. 22, 2019, whose entire disclosures are hereby incorporated by reference.

TECHNICAL FIELD

The present disclosure relates generally to a plant cultivation apparatus capable of automatically performing air circulation, light supply, and water supply for plant cultivation and a water supply control method therefor.

BACKGROUND ART

Generally, a plant cultivation apparatus is a device cultivating plants in a seed state.

Recently, the plant cultivation apparatus has been provided in various forms that may easily cultivate plants indoors.

The indoor plant cultivation apparatus may be classified into a hydroponic cultivation apparatus and a soil cultivation apparatus.

The hydroponic cultivation apparatus is a device that cultivates a plant by a method in which roots of a plant are immersed in water mixed with a nutrient solution, as proposed in Korean Patent Application Publication No. 10-2012-0007420 (document 1), Korean Patent Application Publication No. 10-2012-0028040 (document 2), Korean Patent No. 10-1240375 (document 3), and Korean Patent No. 10-1422636 (document 4).

However, in the case of the hydroponic cultivation apparatus such as documents 1 to 4, when feed water in which the roots of the plant are immersed is used without continuous circulation or replacement, contamination of the feed water, such as green algae, may occur. The contamination of the feed water may cause odor.

Further, the soil cultivation apparatus is a device using a cultivation method of planting a plant (or seeds) in soil of a pot and continuously supplying water to the pot, as proposed in Korean Patent No. 10-1400375 (document 5), Korean Utility Model Registration No. 20-0467246 (document 6), and Korean Utility Model Registration No. 20-0465385 (document 7).

In this case, compared to the hydroponic cultivation apparatus using nutrient solution, the soil cultivation apparatus may further improve growth of a plant due to nutrients in the soil and increase the growth rate of the plant.

However, in the case of above-described documents 5 and 7, the soil cultivation apparatus may be operated such that, feed water sufficiently stored in a water storage is supplied to the soil in culture ground by using an absorbing member, without periodically supplying water to the soil. In the case of document 6, since the soil cultivation apparatus is provided such that a plug tray is supplied in a state of being immersed in nutrient solution of a supply bed, the soil in the culture ground (or plug tray) may be discharged outward of the plant cultivation apparatus so that sufficient soil may not be provided.

In addition, in the case of documents 5 to 7, considering that nutrient solution is supplied into the feed water stored in the water storage, contamination of the feed water due to deterioration of the nutrient solution may occur.

Further, in documents 5 to 7, a circulation structure of pumping the feed water stored in the water storage of a growth chamber and supplying the feed water to each water storage is proposed. Therefore, when the feed water stored in the water storage of the growth chamber is contaminated, feed water stored in other water storages may be easily contaminated.

Further, in documents 5 to 7, due to a water supply hose connected to the water storage (or nutrient solution container), the water storage may not be taken out of a cabinet. When the washing of the water storage is not continuously performed, contamination of the feed water may occur severely.

On the other hand, the above-described hydroponic cultivation apparatus or soil cultivation apparatus is not suitable for installation in a built-in manner when considering continuous cleaning of the water storage or water replenishment, and thus has a disadvantage of having a limitation on the installation space.

DISCLOSURE OF INVENTION

Technical Problem

An objective of the present disclosure is to provide a new type plant cultivation apparatus in which maintenance such as replenishment of feed water or cleaning of a water tank is easily made even when being installed in a specific space, such as in a built-in method and a water supply control method therefor.

Another objective of the present disclosure is to provide a new type plant cultivation apparatus and a water supply control method therefor, which allow only a proper amount of water to be supplied to plants.

Still another objective of the present disclosure is to provide a new type plant cultivation apparatus which is configured as a non-circulating structure in which the supplied water may be normally stored in a separate water tank, which is blocked from the outside environment, and the supplied water being supplied to the plants when necessary, so that contamination of the feed water may be prevented, and a water supply control method therefor.

Still another objective of the present disclosure is to a new type plant cultivation apparatus in which allows a water tank to be easily taken out or positioned in place to making it easy to replenish feed water or clean the water tank and a water supply control method therefor.

Still another objective of the present disclosure is to provide a plant cultivation apparatus and a water supply control method therefor, which assist the rapid growth of plants by efficiently performing water supply according to the growth cycles of the plants.

Still another objective of the present disclosure is to a new type plant cultivation apparatus and a water supply control method, which minimize the amount of residual water by detecting the amount of residual water of water supplied to plants and controlling the water supply.

The technical problems of the present invention are not limited to the aforementioned problems, and any other technical problems not mentioned herein will be clearly understood from the following description by those skilled in the art.

Solution to Problem

A plant cultivation apparatus of the present disclosure supplies feed water required for plant cultivation to a bed, and detects whether residual water remaining in the bed is present to determine whether to supply the water to the bed so that no more water remains in the bed.

Thus, the plant cultivation apparatus of the present disclosure is to supply only a required amount of feed water by not supplying the feed water to a bed when residual water of the feed water is detected in the bed and supplying the feed water to the bed when residual water is not detected.

In the plant cultivation apparatus, a depression may be formed to be recessed from an inner bottom of the bed at a central portion to receive and store the feed water by the water supply module, and a sensing protrusion may be formed to protrude from a bottom surface of the depression, the sensing protrusion having a upper surface positioned higher than the bottom surface of the depression and lower than a bottom surface of the bed.

In this way, the amount of feed water required for plants may be allowed to remain in the depression, and the presence or absence of residual water remaining on the upper surface of the sensing protrusion may be detected to determine whether to supply the feed water.

In particular, the residual water detection sensor may transmit a residual water detection signal corresponding detection of residual water when the residual water is present on the upper surface of the sensing protrusion and transmit a residual water detection signal corresponding non-detection of residual water when the residual water is not present on the upper surface of the sensing protrusion.

The controller may control the water supply module such that feed water is supplied to the depression when the residual water detection signal corresponding non-detection of residual water is received from the residual water detection sensor.

In the plant cultivation apparatus of the present disclosure, the water supply module may include a water tank for storing feed water and a water pump for pumping the feed water in the water tank, and in this case, the controller may supply the feed water to the bed by controlling the water pump according to whether the residual water is present, which is detected by the residual water detection sensor.

The plant cultivation apparatus of the present invention may further include a water level detection sensor that detects a water level of the feed water stored in the water tank, and in this case, the controller may control the water pump such that the feed water is supplied to the bed according to whether the residual water is present, which is detected by the residual water detection sensor when the water level of the feed water detected by the water level detection sensor is higher than or equal to a set threshold water level.

The plant cultivation apparatus of the present disclosure may further a mounting detection part configured to whether the water tank is mounted and the controller may include a display configured to display whether the water tank is mounted, which is detected by the mounting detection part and the water level of the feed water, which is detected by the water level detection sensor.

In a plant cultivation apparatus of the present disclosure, a residual water detection sensor may detect whether residual water of feed water supplied to a bed is present and supply feed water to a bed in which the residual water is not detected. When water supply is performed for a first set time, the water supply may be terminated and the number of times of water supply may be counted. In this case, it is possible to determine whether detection of the residual water is continuously maintained for a second set time due to the water supply by the residual water detection sensor and, according to a result of the determination, determine whether the bed has been completely supplied with water.

The plant cultivation apparatus of the present disclosure may complete the water supply to the bed when detection of the residual water is continuously maintained for the second set time as a result of the determination, and determines whether the counted number of times of water supply has reached the reference number of times and, according to a result of the determination, determine whether water supply to the bed is completed, when detection of the residual water is not continuously maintained for the second set time as the result of the determination.

In this case, when the counted number of times of water supply has reached the reference number of times, it may be performed to complete the water supply to the bed and repeatedly perform the water supply and termination of the water supply until the number of times of water supply has reached the reference number of times or the detection of the residual water is maintained for the second set time when the counted number of times of water supply has not reached the reference number of times.

In the plant cultivation apparatus of the present disclosure, the water supply module may be provided in a cultivation room provided as an independent space from a machine chamber, thus allowing a user to easily perform maintenance of the water supply module.

In the plant cultivation apparatus of the present disclosure, the water supply module may be provided between the bottom of the cultivation room and the bed in the cultivation room, thereby allowing the cultivation space in the cultivation room to be secured as much as possible.

In the plant cultivation apparatus of the present disclosure, the water supply module may be configured to include a water tank in which the feed water is stored and a water pump for pumping the feed water in the water tank, thus allowing the water supply is pumped from the water tank as much as the required amount of the feed water.

The plant cultivation apparatus of the present disclosure may be provided with a mounting detection part to recognize exactly whether the water tank is correctly mounted in place.

The plant cultivation apparatus of the present disclosure may be provided with a water level detection sensor to detect a water level of the water tank, thus accurately recognizing whether the feed water is present in the water tank.

Advantageous Effects of Invention

The plant cultivation apparatus of the present disclosure and the water supply control method thereof as described above have various effects as follows.

First, the present disclosure has the effect that maintenance such as taking out the water tank or replenishing water according to the user's needs may be easily performed because the water tank constituting the water supply module is provided in the cultivation room.

Second, the present disclosure has the effect that the maintenance of the water tank can be easily performed even when the water tank installed in a specific narrow space, such as a built-in method, because the water tank constituting the water supply module is configured as a forward drawable manner.

Third, according to the present disclosure, since the water supply module is operated to supply feed water in cooperation with each residual water detection sensor, only a suitable amount of moisture may be supplied to plants always, thereby preventing the occurrence of residual water.

Fourth, the present disclosure has the effect that the plant cultivation apparatus is configured as the non-circulating structure in which the feed water is normally stored in the separate water tank, which is blocked from the outside environment, and is supplied to the bed only when necessary, thus preventing contamination of the feed water in the water tank.

Fifth, the present disclosure has the effect that the user's use convenience is improved because the water tank in which feed water is stored is configured to be easily taken out.

Sixth, the present disclosure has the effect that the water tank and water pump are always be positioned at correct locations by the installation frame.

Seventh, the present disclosure has the effect that the water supply module is provided between the bottom of the cultivation room and the bed in the cultivation room to secure the cultivation space for the cultivation room as much as possible.

Eighth, the present disclosure has the effect that it is possible to prevent contamination of the feed water in the water tank because the open upper surface of the water tank is configured to be opened and closed with an opening/closing cover.

Ninth, the present disclosure has the effect that the opening and closing of the water tank may be easily made because the opening/closing cover is rotatably installed in the water tank.

Tenth, the present disclosure has the effect that the water storage amount of the water tank may be maximized because the water supply connection tube is provided in the opening/closing cover.

Eleventh, the present disclosure has the effect that the water level of feed water in the water tank may be accurately recognized even with the user's naked eyes because the opening/closing cover includes the cover window.

Twelfth, the present disclosure has the effect that contamination of the feed water in the water tank may be prevented from being contaminated because the surrounding frame is formed in the opening/closing cover.

Thirteenth, the present disclosure has the effect that it is possible to accurately detect whether or not the water tank is mounted because the mounting detection part is provided on the installation frame.

Fourteenth, according to the present disclosure, the upper surface frame is provided at the upper end of the installation frame, and a residual water detection sensor that detects whether there is residual water of feed water supplied to the bed is provided in the upper surface frame, thus accurately detecting whether the residual water is present.

Fifteenth, according to the present disclosure, the feed water is supplied to the bed. In this case, it is possible to prevent the feed water from being supplied more than necessary by detecting whether the residual water remains in the bed.

BRIEF DESCRIPTION OF DRAWINGS

FIG. 1 is an exploded-perspective view showing a plant cultivation apparatus according to an embodiment of the present disclosure.

FIG. 2 is a perspective view showing the exterior of the plant cultivation apparatus according to embodiment of the present disclosure, the plant cultivation apparatus in a state in which an opening/closing door of the plant cultivation apparatus is closed.

FIG. 3 is a perspective view showing the exterior of the plant cultivation apparatus according to the embodiment of the present disclosure, the plant cultivation apparatus in a state in which an opening/closing door of the plant cultivation apparatus is opened.

FIG. 4 is an exploded perspective view showing a pod of a plant cultivation apparatus according to an embodiment of the present disclosure.

FIG. 5 is a side section view showing the pot of the plant cultivation apparatus according to the embodiment of the present disclosure.

FIG. 6 is a side section view showing the plant cultivation apparatus according to the embodiment of the present disclosure.

FIG. 7 is a sectioned-perspective view showing an internal structure of the plant cultivation apparatus according to the embodiment of the present disclosure.

FIG. 8 is a perspective view showing an internal structure of a machine chamber of the plant cultivation apparatus according to the embodiment of the present disclosure.

FIG. 9 is a plan view showing the internal structure of the machine chamber of the plant cultivation apparatus according to the embodiment of the present disclosure.

FIG. 10 is a perspective view showing a bed of the plant cultivation apparatus according to the embodiment of the present disclosure;

FIG. 11 is a perspective view showing the bed of the plant cultivation apparatus according to the embodiment of the present disclosure, the view being taken from another direction.

FIG. 12 is a plan view showing the bed of the plant cultivation apparatus according to the embodiment of the present disclosure.

FIG. 13 is a cutaway perspective view showing a bed of the plant cultivation apparatus according to the embodiment of the present disclosure.

FIG. 14 is a side section view showing the bed of the plant cultivation apparatus according to the embodiment of the present disclosure.

FIG. 15 is a sectioned-perspective view showing a coupled state between the bed, a bed cover, and the pod of the plant cultivation apparatus according to the embodiment of the present disclosure.

FIG. 16 is a main-part section view showing an installation state of the bed of the plant cultivation apparatus according to the embodiment of the present disclosure.

FIG. 17 is an enlarged view of part "A" in FIG. 7.

FIG. 18 is a perspective view showing a lighting module of the plant cultivation apparatus according to the embodiment of the present disclosure, the view being taken from an upper side of the plant cultivation apparatus.

FIG. 19 is a perspective view partially showing a section of the lighting module of the plant cultivation apparatus according to the embodiment of the present disclosure.

FIG. 20 is a perspective view showing the lighting module of the plant cultivation apparatus according to the embodiment of the present disclosure, the view being taken from a lower side of the plant cultivation apparatus.

FIG. 21 is a section view showing the lighting module of the plant cultivation apparatus according to the embodiment of the present disclosure.

FIG. 22 is an enlarged view of part "B" in FIG. 7, the view showing a circulation fan assembly of the plant cultivation apparatus according to the embodiment of the present disclosure.

FIG. 23 is an exploded perspective view showing a water supply module of the plant cultivation apparatus according to the embodiment of the present disclosure.

FIG. 24 is an assembled perspective view showing a water supply module of the plant cultivation apparatus according to the embodiment of the present disclosure.

FIG. 23 is an exploded perspective view showing a structure of a water tank of a water supply module of the plant cultivation apparatus according to the embodiment of the present disclosure.

FIG. 23 is a perspective view showing a state in which an opening and closing cover of a water supply module of the plant cultivation apparatus according to the embodiment of the present disclosure is opened.

FIG. 23 is a main-part section view showing a coupling structure for a handle of a water tank of a plant cultivation apparatus according to an embodiment of the present disclosure.

FIG. 28 is a side view showing a state in which an opening and closing cover of a water supply module of the plant cultivation apparatus according to the embodiment of the present disclosure is opened.

FIG. 29 is a side view showing a state in which the water tank of the water supply module of the plant cultivation apparatus according to the embodiment of the present disclosure is coupled to the installation frame.

FIG. 30 is a section view showing a state in which the water tank of the water supply module of the plant cultivation apparatus according to the embodiment of the present disclosure is coupled to the installation frame.

FIG. 31 is an enlarged view of part "C" in FIG. 30.

FIG. 32 is a section view showing a state in which the water tank of the water supply module of the plant cultivation apparatus according to the embodiment of the present disclosure is separated from the installation frame.

FIG. 33 is an enlarged view of part "D" in FIG. 32.

FIG. 34 is a rear view showing a state in which the water tank of the water supply module of the plant cultivation apparatus according to the embodiment of the present disclosure is coupled to the installation frame;

FIG. 35 is a block diagram of a plant cultivation apparatus according to an embodiment of the present disclosure.

FIG. 36 is an exemplary view of an input unit and a display of a plant cultivation apparatus according to an embodiment of the present disclosure.

FIG. 37 is a plan view for describing the flow of air into a machine chamber of a plant cultivation apparatus according to the embodiment of the present disclosure.

FIG. 38 is a plan view for describing a state of supply of water into a bed in the plant cultivation apparatus according to the embodiment of the present disclosure.

FIG. 39 is a cross-sectional view for describing the flow of air into a cultivation room in the plant cultivation apparatus according to the embodiment of the present disclosure.

FIG. 40 is a time chart for describing the start and stop of water supply according to an embodiment of the present disclosure.

FIG. 41 is a flowchart for describing a method of controlling water supply in a plant cultivation apparatus according to an embodiment of the present disclosure.

FIG. 42 is a flowchart for describing a method of controlling water supply in a plant cultivation apparatus according to another embodiment of the present disclosure.

FIG. 43 is a flowchart for describing a method for controlling water supply in a plant cultivation apparatus according to still another embodiment of the present disclosure.

MODE FOR THE INVENTION

Advantages and features of the present disclosure and methods for achieving them will be apparent with reference to embodiments described below in detail in conjunction with the accompanying drawings. However, the present disclosure is not limited to the embodiments disclosed below, but can be implemented in various forms, and these embodiments are to make the disclosure of the present disclosure complete, and are provided so that this disclosure will be thorough and complete and will fully convey the scope of the invention to those of ordinary skill in the art, which is to be defined only by the scope of the claims. Like reference numerals refer to like elements throughout the specification.

Hereinbelow, an exemplary embodiment of a plant cultivation apparatus of the present disclosure will be described with reference to FIGS. 1 to 37.

FIG. 1 is an exploded-perspective view showing the plant cultivation apparatus according to the embodiment of the present disclosure. FIG. 2 is a perspective view showing the plant cultivation apparatus according to the embodiment of the present disclosure. FIG. 3 is a perspective view showing the plant cultivation apparatus according to the embodiment of the present disclosure, the plant cultivation apparatus in a state in which an opening/closing door thereof is opened.

As shown in the drawings, the plant cultivation apparatus according to the embodiment of the present disclosure may include a cabinet 100, a machine chamber frame 200, and a water supply module 700.

The water supply module 700 may be provided in cultivation rooms 121 and 122 which are separated from a machine chamber 201, and may be exposed when the opening/closing door 130 is opened, thereby making it easy to replenish water to the water tank 710 and clean the water tank 710, and allowing the plant cultivation apparatus to be installed in a specific space in a built-in manner.

Of course, the water supply module 700 may be installed inside the machine chamber 201 or in a separate space separated from the cultivation rooms 121 and 122 and the machine chamber 201, not in the cultivation rooms 121 and 122.

Hereinbelow, the plant cultivation apparatus according to the present embodiment will be described for each configuration.

FIG. 4 is an exploded perspective view showing a pod of a plant cultivation apparatus according to an embodiment of the present disclosure, and FIG. 5 is a side section view showing the pot of the plant cultivation apparatus according to the embodiment of the present disclosure.

First, a pod 10 will be described with reference to FIGS. 4 and 5.

The pod 10 may be formed in an upward open container. Bed soil 11 containing the nutrient solution (not shown) may be filled in the pod 10.

The nutrient solution may be a material containing a nutrient that is supplied to a plant to grow better. The nutrient solution may be provided in a water-soluble capsule form that gradually dissolves in water, so that the nutrient solution may be contained in the feed water while gradually dissolving every time when the feed water is supplied.

In addition, a seed paper 12 may be provided on an upper surface of the bed soil 11. The seed paper 12 may be a part where seeds are planted in a predetermined arrangement, and when the feed water is supplied while the seed paper 12 is seated on the upper surface of the bed soil 11, the seed paper 12 may completely dissolve and the seeds may remain on the bed soil 11.

A brick 13 may be provided on an upper surface of the seed paper 12. The brick 13 may be configured to control moisture and humidity of soil and to prevent mold growth, and be formed by processing mineral ore such as vermiculite into a powder form and then compresses.

An upper surface of the pod 10 may be covered with a protection sheet 15, thereby protecting the inside thereof. In particular, a packing member 14 may be provided between an upper surface of the brick 13 and the protection sheet 15, so that the brick 13 may be protected from the outside environment.

A type of a plant to be cultivated may be printed on a surface of the protection sheet 15.

Meanwhile, a protrusion 16 may be formed downward on a lower surface of the pod 10 and the protrusion 16 may be formed in a container body in which a water flow hole 16a may be provided at a lower surface thereof. The protrusion 16 may be formed in a hollow pipe structure that is open vertically and empty inside.

Further, a first absorber member 17 absorbing the feed water supplied to the bed 300 may be provided in the protrusion 16, and a flat plate shaped second absorber member 18 may be provided between the first absorber member 17 and the bed soil.

The second absorber member 18 may serve to uniformly supply the feed water absorbed by the first absorber member 17 to the entire portion of the bed soil 11.

Next, the cabinet 100 will be described with reference to FIGS. 1 to 3.

The cabinet 100 may be a part that forms the exterior of the plant cultivation apparatus.

The cabinet 100 may be formed in a container body that is open frontward, and include an outer case 110 providing an outer wall surface thereof and an inner case 120 providing an inner wall surface.

Herein, the outer case 110 may be formed in a container body shape that is closed at an upper surface, and a lower surface and a front surface are open.

The inner case 120 may be positioned in the outer case 110 while being spaced apart from the outer case 110. A foam insulation (not shown) may be filled between the inner case 120 and the outer case 110.

The cultivation room 121, 122 may be provided in the inner case 120. The cultivation rooms 121, 122 may be spaces provided for cultivation of plants.

The cultivation room 121, 122 may include an upper cultivation room 121 and a lower cultivation room 122. The two cultivation rooms 121 and 122 may be configured to have separate spaces, respectively.

The cabinet 100 may have an opening/closing door 130 at a front surface thereof.

The opening/closing door 130 may be configured to open and close the cultivation room 121, 122 of the cabinet 100. That is, as the opening/closing door 130 is provided in the cabinet 100, the plant cultivation apparatus according to the embodiment of the present disclosure may be a closed-type cultivation apparatus.

In particular, in the case of the closed-type cultivation apparatus, the plant cultivation apparatus may cultivate the plant while providing a sufficient amount of light and maintaining a predetermined temperature therein by lighting module 401, 402, a circulation fan assembly 500, and a temperature control module 600, which will be described below.

Meanwhile, the opening/closing door 130 may be one of a rotary type opening and closing structure and a sliding type opening and closing structure. Further, the door 130 may be configured to block the front surface of the cabinet 100.

In the present embodiment, the opening/closing door 130 is configured as the rotary type opening and closing structure.

As an embodiment, the opening/closing door 130 may include a door frame 131 having a rectangular frame structure with an empty inside portion and a sight glass 132 blocking the empty inside portion of the door frame 131.

Preferably, the sight glass 132 may be formed of a transparent material, for example, may be formed of glass.

When the sight glass 132 is formed of glass, a protecting film (not shown) may be attached on the glass. The protecting film may be a light shading film (partially shading) that minimizes the leakage of light from the cultivation room indoors.

Instead of the protecting film, the sight glass 132 may have a dark color, so that the leakage of light indoors may be minimized.

In addition, the opening/closing door 130 may be composed of only a transparent window 132 without the door frame 131.

Next, the machine chamber frame 200 will be described with reference to FIGS. 1 and 6 to 9.

The machine chamber frame 200 may constitute a bottom portion of the plant cultivation apparatus according to the embodiment of the present disclosure.

The machine chamber frame 200 may be extended from a lower portion of the outer case 110, as shown in FIG. 1. The machine chamber frame 200 may include a bottom plate 211 constituting a bottom of the machine chamber frame 200, side surface plates 212 constituting opposite side surfaces thereof, a rear surface plate 213 constituting a rear surface thereof, and an upper surface plate 214 constituting an upper surface thereof.

That is, the machine chamber frame 200 may be formed in a box shaped structure that has an open front surface. In this case, the upper surface plate 214 may be provided as a bottom of the cultivation rooms 121 and 122 in the cabinet 100.

The machine chamber frame 200 may be configured such that an open lower surface of the outer case 110 is placed thereon and is coupled thereto.

The machine chamber frame 200 and the inner case 120 may be disposed to be spaced apart from each other and the side surface plates 212 and the rear surface plate 213 of the machine chamber frame 200 may be respectively configured to be connected to opposite side surfaces and a rear surface of the outer case 110.

In addition, the interior space of the machine chamber frame 200 may be provided as the machine chamber 201.

That is, the machine chamber 201 and the cultivation rooms 121 and 122 may be respectively formed to have a space in the inner case 120 and a space in the machine chamber frame 200 which are separate from each other, thus providing independent spaces from each other.

A part of components of the temperature control module 600, which will be described below, may be provided in the machine chamber 201.

Although not shown in the drawings, the inner case 120 and the machine chamber frame 200 may be formed in a singly body. In this case, a separate partition for separating two spaces may be provided between the cultivation room 121, 122 and the machine chamber 201 so that the cultivation room 121, 122 and the machine chamber 201 may be formed to have spaces which are independent from each other.

Further, an intake and exhaust grill 220 may be provided on the open front surface of the machine chamber frame 200 that is the front of the machine chamber 201. That is, the intake and exhaust grill 220 may serve to guide airflow suctioned from the indoor into the machine chamber 201 or airflow discharged from the machine chamber 201 to the indoor and to block the open front surface of the machine chamber 201.

In addition, the intake and exhaust grill 220 may have an inlet 221 and an outlet 222. The inlet 221 and the outlet 222 may be separated from each other by being arranged at positions separated by a partition 230. In the embodiment of the present disclosure, the inlet 221 and the outlet 222 may be distinguished as the inlet 221 at the left and the outlet 222 at the right, when viewed from the front of the plant cultivation apparatus.

This is as shown in FIGS. 2 and 3.

Further, the partition 230 separating a space inside the machine chamber 201 into left and right sides may be provided in the machine chamber frame 200. That is, flow paths through which air flows into and is discharged from the machine chamber 201 may be separated by the partition 230.

A flow path through which air flows into the machine chamber 201 may be a space on the side on which the inlet 221 of the intake and exhaust grill 220 is positioned, and a flow path through which air is discharged from the machine chamber 201 may be a space on the side on which the outlet 222 of the intake and exhaust grill 220 is positioned.

In addition, the opposite spaces in the machine chamber 201 which are separated by the partition 230 may be configured to communicate with each other at a rear portion of the spaces. That is, a rear end portion of the partition 230 may be spaced apart from a rear wall surface in the machine chamber 201, not to be in contact therewith, so that the opposite spaces separated from each other may communicate with each other.

Although not shown in the drawings, an open hole (not shown) may be provided in the rear end portion of the partition 230 to allow the opposite spaces in the machine chamber 201 to communicate with each other.

Further, the partition 230 may be formed in a straight line shape, and may be formed in an inclined structure or a bent structure. In the present embodiment, the partition 230 is formed in the bent structure. That is, by bending a part of the partition 230 by bending, portions in which the condenser 620 and the compressor 610 that will be described later are installed may be secured to be sufficiently large, compared to other portions.

Further, a condensed water reservoir 240 may be provided in the machine chamber 201 of the machine chamber frame 200. The condensed water reservoir 240 that is described above may be positioned at a bottom at the side where air flows into the machine chamber 201 through the inlet 221, and may server to receive condensed water flowing down from the condenser 620 and to fix the condenser 620 in the machine chamber.

Further, a heat exhaust opening 202 may be formed by penetrating the rear surface plate 213 of the machine chamber frame 200. The heat exhaust opening 202 may be a hole provided to discharge (or suction) air dissipating heat of the compressor 610, which will be described below. That is, the heat exhaust opening 202 is additionally provided, so that the discharge of air may be smoothly performed.

The bottom plate 211 of the machine chamber frame 200 may have a discharge hole 203 that is provided to discharge the air dissipating heat of the compressor 610.

Meanwhile, a rear portion of the upper surface plate 214 providing the machine chamber frame 200 may be formed to protrude upward more than other portions thereof, so that the rear portion of the inside of the machine chamber 201 may have a high space compared to other portions. That is, considering a protruding height of the compressor 610 provided in the machine chamber 201, the rear portion of the machine chamber 201 may be formed higher than the other portions thereof.

Further, a control module 20 (see FIG. 6) may be provided in a front space between an upper surface of the upper surface plate 214 and a lower surface of the inner case 120, the lower surface thereof facing the upper surface of the upper surface plate 214, the control module 20 being provided to control operation with respect to each component of the plant cultivation apparatus.

Next, the bed 300 will be described with reference to FIGS. 10 to 17.

The bed 300 may be a part provided to place the pod 10 thereon.

The bed 300 may be formed in a tray structure having a flat plate shape or a circumference wall, and the bed 300 may be configured to store feed water on an upper surface thereof.

In the present embodiment, first guide rails 101 may be respectively provided on opposite wall surfaces (opposite wall surfaces in the inner case) in the cultivation room 121, 122. The first guide rails 101 may guide the bed 300 to be moved back and forth so that the bed 300 may be taken out from the cultivation room 121, 122 in a drawer manner.

Guide ends 301 may be provided on opposite wall surfaces of the bed 300. The guide ends 301 may be configured to be supported by the first guide rails 101, so that the bed 300 may be taken out from the cultivation room 121, 122 in the drawer manner.

In other embodiments, through other various other structures, the bed 300 may be taken out from the cultivation room 121, 122 in the drawer manner.

Further, a water reservoir 310 may be provided in a rear surface of the bed 300. The water reservoir 310 may be a part receiving the feed water from the outside of the bed 300 and providing the feed water into the bed 300.

The water reservoir 310 may protrude rearward from either side portion of the rear surface of the bed 300. In addition, a bottom surface of the water reservoir 310 may be depressed downward thereby guiding the feed water to flow into a communicating portion with a feed water flow path 330, which will be described below.

In addition, at a center portion in the bed 300, a depression 320 that is depressed from a bottom in the bed 300 is provided. Thereby, the feed water supplied to the water reservoir 310 is guided by the feed water flow path 330 to be supplied to the depression 320.

The feed water flow path 330 is formed in a groove extended from the water reservoir 310 to the depression 320. Although not shown in the drawings, the feed water flow path 330 may be a separate pipe or hose from the bed 300.

In particular, the feed water flow path 330 may be formed in an inclined or round structure, the structure being gradually inclined downward as the feed water flow path 330 goes from the water reservoir 310 to the depression 320.

That is, by the above-described inclined or round structure, the supply of the feed water may be performed quickly and the feed water supplied to the depression 320 may be prevented from flowing back to the water reservoir 310.

In addition, bank parts 331 may be provided at opposite sides of the feed water flow path 330, the bank parts 331 being provided to precisely guide the feed water. That is, by the bank parts 331, the feed water supplied along the feed water flow path 330 may be smoothly supplied to the depression 320 without deviating from the feed water flow path 330.

Further, a dam part 340 may be formed on a center portion in the depression 320, the dam part 340 protruding upward from a surface of the depression 320. The dam part 340 may be formed in a long protrusion that is long in a left and right direction of the bed 300. Based on the dam part 340, the depression 320 may be divided into a front depression 321 and a rear depression 322.

That is, when a plurality of pods 10 are seated in rows of the front and rear of the bed 300, pods 10 at the front row are arranged to be in contact with the front depression 321 while the protrusion 16 of each of the front pods is positioned rearward, and pods 10 at the rear row are arranged to be in contact with the rear depression 322 while the protrusion 16 of each of the rear pods is positioned forward.

In particular, the dam part 340 may protrude from a bottom in the depression 320, thus the feed water does not remain. Further, the dam part 340 may serve to guide the feed water to be supplied to only a portion where the protrusion 16 of the pod 10 is positioned.

Further, a flow guidance groove 302 may be provided in a portion of the bottom surface in the depression 320, the portion communicating with the feed water flow path 330.

That is, the feed water flowing along the feed water flow path 330 may be guided by the flow guidance groove 302 in the process of flowing into the depression 320 to flow from one side of the depression 320 to another side thereof.

In addition, a sensing protrusion 323 may protrude from the bottom surface in the depression 320. An upper surface of the sensing protrusion 323 may be positioned higher than the bottom surface of the depression 320 and may be positioned lower than the bottom surface of the bed 300.

Meanwhile, a plurality of beds 300 may be provided. In this case, the beds 300 may be respectively provided in the cultivation rooms 121 and 122 while being vertically spaced apart from each other.

Of course, in other embodiments, the beds 300 may be installed spaced apart from each other left and right.

A vertical distance between the beds 300 may be set differently in response to sizes in the cultivation rooms 121 and 122 or the type of plant to be cultivated. For example, as the first guide rails 101 that are provided on the opposite wall surfaces in the cultivation room 121, 122 are configured to be adjusted in vertical position, the vertical distance between the beds 300 may be adjusted as needed.

A bed cover 350 may be further provided on the bed 300.

The bed cover 350 may be a part where the pod 10 is seated at a precise position thereof. An upper surface of the bed cover 350 has a plurality of seating depressions 351 and 352 for the seating of each of the pods 10.

Each of the seating depressions 351 and 352 may have a width roughly equal to a width of the pod 10 and be depressed at a depth sufficient to partially receive the pod 10 therein. The bed cover 350 may be formed of a metal material, and in particular, it is preferable that the bed cover 350 is formed of stainless steel to prevent corrosion. The bed 300 may be formed of acrylonitrile, butadiene, styrene (ABS) resin.

In addition, the penetration hole 351a, 352a may be provided in the seating depressions 351, 352 to allow the protrusion 16 of the pod 10 to penetrate the seating groove 351, 352. That is, a user may place the pod 10 at the precise position thereof by checking positions of the penetration hole 351a, 352a and the protrusion 12.

In particular, the seating depressions 351 and 352 may be divided into a front row seating groove 351 on which each of the pods 10 at the front row is seated and a rear row seating depression 352 on which each of the pods 10 at the rear row is seated. The penetration hole 351a of the front row seating depression 351 and the penetration hole 352a of the rear row seating depression 352 may be arranged adjacent to each other. That is, when the bed cover 350 is seated on the bed 300, the penetration holes 351a and 352a may be respectively positioned at the front depression 321 and the rear depression 322 of the bed 300.

Further, a handle 360 may be provided in a front surface of the bed 300. The user can take out or reinstall the bed 300 in the drawer manner by using the handle 360.

The handle 360 may be configured such that a front surface thereof is not in contact with an inside surface of the opening/closing door 130, thus a gap may be provided between the front surface of the handle 360 and the opening/closing door 130. That is, through the gap, air may flow between a lower cultivation room 121 and an upper cultivation room 122, and air flowing through the lower cultivation room 122 may be discharged outward of the plant cultivation apparatus through the gap.

Through the flow of air passing through the gap, a surface of the opening/closing door 130 may be prevented from condensation.

Next, the lighting module 401, 402 will be described with reference to FIGS. 18 to 21.

The lighting module 401, 402 may be a part for emitting light to the pod 10 seated on the bed 300 in the cultivation room 121, 122. That is, as the lighting module 401, 402 is provided in the plant cultivation apparatus, the plant cultivation apparatus may continue to provide light to the plant, in spite of being the closed-type cultivation apparatus.

In the embodiment, the lighting module 401, 402 may be a light emitting diode (LED) 421 and be configured to emit light.

The lighting module 401, 402 may include a lighting case 410 constituting an outside appearance of the lighting module 401, 402, a circuit board 420 in which the LED 421 is embedded, and the lighting cover 430 covering the lighting case 410.

The lighting case 410 may be a part where the circuit board 420 is provided. In addition, the lighting case 410 may have a plurality of lighting holes 411. The circuit board 420 may be provided by being fixed to an upper surface of the lighting case 410.

The LEDs 421 embedded in the circuit board 420 may be arranged to emit light through the lighting holes 411 of the lighting case 410.

The lighting cover 430 which are exposed to the cultivation rooms 121 and 122 may protect the circuit board 420 from moisture in the cultivation rooms 121 and 122.

It is preferable that the surface of the lighting cover 430 is coated or surface-processed for the diffusion of light. Thus, light emitted from the LED 421 may be uniformly dispersed to the entire portion in the cultivation room 121, 122 without being focused on one portion.

Meanwhile, when the cultivation rooms 121 and 122 in the inner case 120 are to be provided as two cultivation spaces up and down, the lighting modules 401 and 402 may be provided as a first lighting module 401 provided on the upper wall surface in the inner case 100 and a second lighting module 402 installed to cross between the upper cultivation room 121 and the lower cultivation room 122 to emit light to the lower cultivation room 122.

That is, since the second lighting module 402 functions as a partition wall that separates the two cultivation rooms 121 and 122 up and down, it may be not necessary to provide a separate partition wall, whereby the size of each cultivation room 121 and 122 is maximized.

The second lighting module 401 may be configured such that, a rear end thereof is fixed by a fan guide 520 of the circulation fan assembly 500, which will be described below.

Further, a residual water detection sensor 440 may be provided on the upper surface of the second lighting module 402. The residual water detection sensor 440 may detect residual water remaining in the depression 320 of the bed 300 accommodated in an upper cultivation space.

In particular, the residual water detection sensor 440 may be positioned in a portion where a sensing protrusion 323 is formed in the bottom of the bed 300 to detect whether residual water is present on the upper surface of the sensing protrusion 323.

The residual water detection sensor 440 may be configured of a capacitance-type sensor and accurately detect the residual water in the depression 320.

The residual water detection sensor 440 may be configured of other methods not shown in the drawings. For example, the second residual water detection sensor 440 may be configured as a mechanical sensor such as a floating method or an electronic sensor using two electrodes.

A temperature sensor 450 may be provided on the upper surface of the second lighting module 402. The temperature sensor 450 may serve to detect the temperature in the cultivation room 121, 122 and allow the air temperature to be controlled by the temperature control module 600.

Next, the circulation fan assembly 500 will be described with reference to FIGS. 1, 6, 7, and 22.

The circulation fan assembly 500 may be provided to circulate air in the cultivation room 121, 122.

The circulation fan assembly 500 may be provided in the rear space of the cultivation room 121 or 122 of a space inside the cabinet 100, and may be configured to discharge air to the upper space of the corresponding cultivation room 121 or 122 after air is sucked from the lower space in the cultivation room 121 or 122.

Meanwhile, the circulation fan assembly 500 may be provided for each of the cultivation rooms 121 and 122, or the single circulation fan assembly 500 may be configured to control air circulation to all the cultivation rooms 121 and 122.

In the present embodiment, the circulation fan assembly 500 may be provided for each of the cultivation rooms 121 and 122. That is, the air circulations in the cultivation rooms 121 and 122 may be performed equally or separately by the circulation fans assemblies 500, respectively.

When the air circulation may be controlled separately for each of the cultivation rooms 121 and 122, plants that require different types of cultivation environments may be simultaneously cultivated in the cultivation rooms 121 and 122.

The circulation fan assembly 500 may include circulation fans 510, the fan guide 520, and a partition wall 530.

The circulation fans 510 may be fans driven to blow air. The circulation fans 510 may be radial flow fans that suction air in a shaft direction thereof and blows the air in a radial direction.

Further, the fan guide 520 may be a part guiding a flow of air blown by the circulation fans 510 as the circulation fans 510 is provided in the cultivation room.

The fan guide 520 may have an installation hole 521 formed by penetrating the fan guide 520, the installation hole being provided to receive the circulation fans 510. The shroud 520 may have an air guide 522 at a front surface thereof, the air guide 522 guiding air suctioned through the circulation fans 510 from a rear space in the cabinet 100 to flow into the cultivation room 121, 122.

The air guide 522 may be configured to guide air blown in the radial direction of the circulation fans 510 to flow to the upper space in the cultivation room 121, 122.

Further, the partition wall 530 may be a part that is positioned at the front of the fan guide 520 and blocks the fan guide 520 from the cultivation room 121, 122.

That is, the partition wall 530 may protect the circulation fans 510 from the inside of the cultivation room 121 or 122.

A lower portion of the partition wall 530 may be open to the inside of the cultivation room 121 or 122. Thus, air flowing in the cultivation room 121 or 122 may flow to the rear surface in the cabinet 100 through the open lower portion of the partition wall 530 and be then subjected to heat exchange with an evaporator 630. Continuously, the air may repeat the circulation of being supplied to the upper space in the cultivation room 121, 122 by blowing force of the circulation fans 510 and flow guidance of the fan guide 520.

In particular, opposite side surfaces of the partition wall 530 may be fixed to the opposite wall surfaces or the rear wall surface in the inner case 120. The fan guide 520 may be provided on the partition wall 530.

Next, the temperature control module 600 will be described with reference to FIGS. 7 to 9.

The temperature control module 600 may be configured to control the temperature of air circulating in the cultivation room 121 or 122 of the inner case 120.

The temperature control module 600 may include a refrigeration system including a compressor 610, a condenser 620, and an evaporator 630. That is, the temperature control of the air circulating in the cultivation room 121 or 122 may be performed by the refrigeration system.

The compressor 610 and the condenser 620 may be provided in the machine chamber 201 in the machine chamber frame 200. The condenser 620 may be positioned at the air inflow space of the opposite spaces separated by the partition 230 in the machine chamber frame 200. The compressor 610 may be positioned at a portion through which air passing through the condenser 620 passes.

In particular, the compressor 610 may be positioned in one of the two spaces separated by the partition 230, to which the air is discharged. The above structure may be configured to allow the air flowing into the machine chamber 201 of the machine chamber frame 200 to pass through the condenser 620 by priority.

That is, considering that the compressor 610 is configured to generate a great quantity of heat, when the air conditioning module is configured such that air passes through the compressor 610 and then heat-exchanges with the condenser 620, heat exchange efficiency may be reduced. Accordingly, it is preferable that the air conditioning module is configured such that air passes through the condenser 620 before the compressor 610.

The condenser 620 may be positioned in the front space in the machine chamber 201, and the compressor 610 may be positioned in the rear space in the machine chamber 201.

The structure may be configured to maximally separate positions of the compressor 610 and the condenser 620 and separate the compressor 610 from the condenser 620, so that the effect of the high temperature heat of the compressor 610 to the condenser 620 may be reduced.

Cooling fans 611 may be provided in the air inflow side of the compressor 610 that is the rear portion of the partition 230, so that air may flow into and be discharged from the machine chamber 201 and radiate heat of the compressor 610.

The cooling fans 611 may serve to block a space on air inflow side, in which the condenser 620 is positioned in the rear portion of the partition 230, and a space in which the compressor 610 is positioned. Therefore, effect of high temperature heat of the compressor 610 on the condenser 620 may be reduced.

Further, the evaporator 630 may be arranged in a rear portion of the circulation fan assembly 500 of each portion in the inner case 120. That is, by the operation of the circulation fan assembly 500, during the circulated operation in which air is suctioned from the lower space in the cultivation room and the air is discharged to the upper space in the cultivation room 121 or 122, the air may perform heat-exchange while passing through the evaporator 630.

The evaporator 630 may be a plate shaped evaporator. The evaporator 630 may be stably provided in the rear space in the inner case 120 and may be configured to improve heat exchange performance in a narrow place.

Meanwhile, the temperature control module 600 may have an electric heater. That is, when a plant that lives in a higher temperature environment than the normal indoor environment is cultivated, the electric heater may be used to cultivate the plant.

Next, the water supply module 700 will be described with reference to FIGS. 6, 7 and 23 to 34.

The water supply module 700 may be provided to supply the feed water to the bed 300.

In the present embodiment, the water supply module 700 that stores the feed water in advance may supply water to the bed 300 as much as the required amount when the water supply is needed.

That is, in the conventional cultivation apparatus, the method of supplying the feed water of the required amount is not used, but a method of storing enough feed water in a water storage and supplying the stored feed water to soil by using an absorbing member is used. Herein, the feed water is mixed with a nutrient solution, so that a problem with contamination of the feed water may occur.

However, in the embodiment of the present disclosure, nutrient components may be contained in the culture ground 11 of the pod 10. The feed water of the required amount may be supplied to the pod to prevent residual water from existing in portions other than a water tank 710, so that odor due to contamination of the feed water may be fundamentally prevented.

In particular, in the present embodiment, it is proposed that the water supply module 700 is provided in the cultivation room 121 or 122 (see FIGS. 6 and 7).

That is, the water supply module 700 may be provided in the cultivation room 121 or 122 separated from the machine chamber 201 and be exposed when the opening/closing door 130 is opened.

Accordingly, maintenance of the water supply module 700 (e.g., taking out the water tank) may be easily performed by simply opening the opening/closing door 130 according to the needs of a user.

On the other hand, the water supply module 700 may be disposed between the bottom surface of the inner case 120 (cultivation room) and the bed 300. That is, considering that a gap may be provided between the bottom 123 of the inner case 120 and the bed 300 because the upper surface plate 214 of the machine chamber frame 200 partially protrudes upward due to the height of the compressor 610 in the machine chamber 201, the water supply module 700 may be positioned in the gap so that the cultivation space of the cultivation room 121 or 122 may be formed to be large enough.

The water supply module 700 may include a water tank 710 and a water pump 720 as shown in the attached FIGS. 23 and 24. The water tank 710 may be a portion where the feed water is stored and a portion which pumps the feed water to supply water to the water pump 720.

The water tank 710 may be formed in a square box-shaped structure with an open top surface (see FIG. 25).

Further, the water tank 710 may be positioned in the front space in the cabinet 100 and be provided to be drawable from the cabinet 100. That is, considering that the rear portion of the machine chamber 201 may be formed to be higher than the other portion due to the height of the compressor 610, the water tank 710 may be provided in a front portion of a lower portion in the inner case 120 provided due to the upward protruding portion of the machine chamber 201.

In this case, the second guide rails 102 (see FIG. 1) for guiding the front and rear movement of the water tank 710 may be provided on both side walls in the cabinet 100, and a guidance guide 712 (see FIG. 23) which is seated on the second guide rails 102 to be guided for movement may be provided.

In addition, the water tank 710 may be configured to be exposed to the indoor when the opening/closing door 130 is opened. That is, the opening/closing door 130 may be configured to block not only the cultivation room 121, 122 but also the water tank 710, so that the water tank 710 may be exposed outward when the opening/closing door 130 is opened. Thereby, the user can easily take out the water tank 710 to supply the feed water.

In addition, a handle 711 may be provided on the front surface of the water tank 710. Accordingly, the user can take out and reinstall the water tank 710 by using the handle 711 in a drawer manner. In this case, the handle 711 may be formed of a material different from that of the water tank 710 to be coupled and fixed to the water tank 710.

Specifically, a jamming hook 715 may be formed to protrude from the bottom of an upper end of the handle 711, and a jamming groove 716 is recessed from the upper surface of an extension jaw 713 on the front side of the water tank 710, thereby allowing the jamming hook 715 and the jamming groove 716 to be integrated with each other due to hook coupling.

In this case, a fitting groove 717 may be formed to be recessed from the inner surface of the handle 711 such that a front end of the extension jaw 713 is inserted to the fitting groove 717, thus preventing undesired breakaway when the handle 711 is coupled to the water tank 710. This is as shown in FIG. 27.

In particular, the handle 711 of the water tank 710 may be also configured not to be in contact with the door 130 like the handle 360 of the open/close bed 300. Thus, a gap may be provided between a front surface of the handle 711 and the opening/closing door 130 (see FIG. 6).

Further, an open upper surface of the water tank 710 may be configured to be opened and closed by an opening/closing cover 750. That is, the upper surface of the water tank 710 may be selectively opened and closed by the opening/closing operation of the opening/closing cover 750, thereby allowing the feed water to be filled through the open upper surface of the water tank 710.

In addition, as shown in FIGS. 26 and 28, the opening/closing cover 750 may be rotatably installed in the water tank 710. Accordingly, the user may easily open and close the opening/closing cover 750.

In particular, the extension jaw 713 maybe formed to be bent outward along the periphery of the upper surface of the water tank 710, and the edges of the bottom of the opening/closing cover 750 may be placed on and be in close contact with the expansion jaw 713.

In this case, incision grooves 714 may be formed on both opposite front portions of the extension jaw 713, so that the user lifts the bottom of the opening/closing cover 750 exposed to the bottom through the incision grooves 714 to easily open the opening/closing cover 750.

Further, the opening/closing cover 750 may be provided with a water supply connection tube 760. The water supply connection tube 760 may be a pipe configured to be connected to the water pump 720 to transfer the feed water stored in the water tank 710 to the water pump 720.

That is, the water pump 720 may be configured to be selectively connected to the water tank 710 by the water supply connection tube 760, not configuration of being directly connected to the water tank 710. Thus, only the water tank 710 may be taken out from the cabinet 100.

The water supply connection tube 760 may include an inlet tube 761 and a connection tube 762, the inlet tube 761 protruding from a lower surface of a rear side of the opening/closing cover 750 into the water tank 710, and the connection tube 762 being provided to be extended toward a rear surface of an upper end of the inlet tube 761 and connected to the water pump 720.

That is, when the water tank 710 is reinstalled in the plant cultivation apparatus, as the connection tube 762 is connected to the water pump 720, the feed water in the water tank 710 may be pumped into the supply hose 730 by the pumping operation of the water pump 720. Further, when the water tank 710 is taken out from the plant cultivation apparatus, the connection tube 762 may be configured to be separated from the water pump 720.

In particular, it is preferable that the inlet tube 761 is formed to protrude to the bottom of the water tank 710 so that the feed water in the water tank 710 may be pumped as much as possible.

In the present embodiment, the water pump 720 may be operated by a pump driving part (not shown) such as a motor. The pump driving part may be controlled by a controller 21 to be described later. Since the pump driving part is a known technology, a detailed description thereof will be omitted.

In addition, as illustrated in FIG. 25, the opening/closing cover 750 may include a cover frame 751 having a square frame with an open interior and a cover window 752 covering an upper surface of the cover frame 751.

In this case, the cover window 752 may be preferably formed of a transparent material (e.g., glass or transparent acrylic). That is, a water level inside the water tank 710 may be easily observed with the user's naked eyes through the cover window 752.

In addition, a seating groove 754 may be recessed from the upper surface of the cover frame 751, and the cover window 752 may be seated on and fixed to the seating groove 754.

Further, the inlet tube 761 may be formed of a tube body that is vertically open. That is, by forming the inlet tube 761 into a tube body that penetrates up and down of the opening/closing cover 750, the inlet tube 761 may be injection molded together with the opening/closing cover 750.

In this case, the open upper surface of the inlet tube 761 may be configured to be closed by the cover window 752, and a pumping force by the water pump 720 may be provided only to the bottom of the inlet tube 761, thereby achieving pumping of the feed water smoothly.

In addition, a surrounding frame 753 may be formed on the bottom of the opening/closing cover 750. The surrounding frame 753 may be formed to protrude downward along the edges of the bottom surface of the opening/closing cover 750 and may be configured to be accommodated in the water tank 710.

That is, when the opening/closing cover 750 covers the water tank 710, the surrounding frame 753 is accommodated into the water tank 710 so that the bottom of the opening/closing cover 750 and the top of the water tank 710 may be blocked.

In particular, the surrounding frame 753 may be formed to gradually increase in protrusion height toward the rear. This structure may guide water droplets (condensation) occurring in the opening/closing cover 750 to flow into the water tank 710 when the opening/closing cover 750 is rotated to open, thus preventing the water droplets from flowing to the cultivation rooms 121 and 122.

The water pump 720 may be a part pumping the feed water in the water tank 710.

The water pump 720 may be positioned in a space on the rear side of a portion where the water tank 710 is installed in a lower space of the inner case 120 (see FIGS. 1, 23, and 29 to 31).

In particular, an installation frame 740 may be provided between the water tank 710 and the water pump 720, and the water pump 720 may be fixed on a rear surface of the installation frame 740.

That is, when the water tank 710 is taken out, the installation frame 740 may prevent the water pump 720 from being exposed outward and allow the water pump 720 to be fixed in a precise position thereof.

In this case, a coupling hole 743 is formed to pass through the installation frame 740, and a pump connection pipe 721 connecting the coupling hole 743 and the water pump 720 is provided on the rear surface of the installation frame 740.

That is, the water pump 720 may be installed in a free position and direction through the additional provision of the pump connection pipe 721, thus allowing the connection with the water supply connection tube 760 to be made smoothly and accurately.

Further, the installation frame 740 may be provided with a mounting detection part 741 for detecting whether or not the water tank 710 is taken out. In this case, the mounting detection part 741 may include a contact switch to determine that the water tank 710 is mounted when the water tank 710 contacts the corresponding the mounting detection part 741 to turn on the contact.

Of course, the mounting detection part 741 may include a proximity sensor, and may be configured variously, such as, to determine that the corresponding water tank 710 is mounted when the water tank 710 is adjacent thereto.

In addition, the installation frame 740 is provided with a water level detection sensor 745 for detecting a water level of feed water in the water tank 710. That is, the water level detection sensor 745 may allow a user to accurately recognize when to replenish the feed water.

Meanwhile, an upper surface frame 744 may be formed to be bent backward at the upper end of the installation frame 740 to cover the upper surface of the water pump 720. That is, the upper surface frame 744 may prevent the water pump 720 from being damaged by blocking the upper surface of the water pump 720 from the bottom of the bed 300 in the cultivation room 121 or 122.

In addition, a residual water detection sensor 742 may be installed on the upper surface frame 744 to detect residual water remaining in the depression 320 of the bed 300 positioned above the upper surface frame 744.

The residual water detection sensor 742 may be installed to protrude upward from the upper surface of the upper surface frame 744. That is, the residual water detection sensor 742 may be installed to be as close as possible to the bed 300 to accurately detect the residual water in the depression 320 of the bed 300.

Here, reference numeral 746 which is not described indicates a protective cover for the installation and protection of the residual water detection sensor 742.

In particular, the residual water detection sensor 742 may be positioned in a portion where a sensing protrusion 323 is formed in the bottom of the bed 300 to detect whether residual water is present on the surface of the sensing protrusion 323.

This structure may allow the residual water detection sensor 742 to be installed as close as possible to the surface of the sensing protrusion 323 to more accurately determine whether to further replenish feed water based on the presence or absence of residual water on the surface of the sensing protrusion 323 and the water absorption amount of each pod.

The residual water detection sensor 440 may be configured of a capacitance-type sensor and accurately detect the residual water in the depression 320.

Of course, the residual water detection sensor 742 may be configured as a mechanical sensor such as a floating method or an electronic sensor using two electrodes.

Next, the supply hose 730 may be a coupling hose for supplying the feed water pumped by the water pump 720 to the bed 300.

The supply hose 730 may be provided such that a first end thereof is connected to the water pump 720 and a second end thereof is positioned directly above the water reservoir 310 of the bed 300.

In particular, a flow path valve 731 may be connected between the supply hose 730 and the water pump 720. That is, the feed water pumped by the water pump 720 may be selectively supplied to the water reservoir 310 of each bed 300 by the flow path valve 731.

The plant cultivation apparatus according to the present embodiment may include a display 800.

The display 800 may be provided to display each condition of the plant cultivation apparatus and to perform various controls.

In this case, an operating state of the plant cultivation apparatus, a temperature in the cultivation room 121 or 122, a cultivation time, a current time, whether the water tank 710 is mounted, information on a water level of the feed water in the water tank 710, and the like may be displayed through the display 800.

Further, the display module 800 may be configured to be operated in a touchable manner, or may be configured to be operated by a button or a switch.

The display module 800 may be provided in the cabinet 100 or in the opening/closing door 130.

However, when the display 800 is provided in the opening/closing door 130, the connection structure of various signal lines or power lines may be inevitably complicated. The display 800 may be preferably provided in the cabinet 100.

Moreover, considering that the sight glass 132 constituting the inside portion of the opening/closing door 130 may be formed of a transparent material such as glass, the display 800 may be preferably provided in the front of the second lighting module 402 among the lighting modules 401 and 402.

FIG. 35 is a block diagram of a plant cultivation apparatus according to the present embodiment, FIG. 36 is an exemplary view of an input unit and a display of the plant cultivation apparatus, FIG. 37 is a plan view for describing the flow of air into a machine chamber of the plant cultivation apparatus, FIG. 38 is a plan view for describing a state of supply of feed water into a bed in the plant cultivation apparatus, and FIG. 39 is a cross-sectional view for describing the flow of air into a cultivation room in the plant cultivation apparatus.

Referring to FIGS. 35 to 39, the operation of the plant cultivation apparatus according to the above-described embodiment of the present disclosure will be described in more detail for each process.

First, an operation of providing the pod 10 will be described.

When a new pod 10 is provided, a bed 300 positioned in the cultivation rooms 121 and 122 is taken out while the opening/closing door 130 is opened to open the cultivation rooms 121 and 122 in the inner case 120.

In this case, the bed 300 is taken out of the cultivation rooms 121 and 122 in the inner case 120 while sliding along the first guide rail 101. Of course, the bed 300 may be taken out only to the extent that an operation of seating the pod 10 can be easily made without discomfort without being completely taken out.

In this state, after a protective film (not shown) of the pod 10 provided is removed, the pod 10 is placed on each of the seating recesses 351 and 352 of the bed cover 350.

In this case, the pod 10 is installed such that the protrusions 16 formed in the bottom surface thereof are positioned to coincide with the penetration holes 351a and 352a formed in the seating recesses 351 and 352, so that the pod 10 is seated in a state of being partially accommodated in the seating recesses 351 and 352.

When the pod 10 in which plant cultivation has been completed exists in the seating recesses 351 and 352 of the bed cover 350, the corresponding pod 10 is taken of the bed cover 350 and a new pod 10 may be seated on the seating recesses 351 and 352.

Then, when the seating of the pod 10 is completed, the bed 300 is pushed such that the bed 300 is received in the cultivation rooms 121 and 122.

The operation of seating the pod 10 is performed sequentially or selectively in either or both of the bed 300 of the upper cultivation room 121 and the bed 300 of the lower cultivation room 122.

Next, the cultivation operation will be described.

In the state in which the pods 10 are provided to the beds 300 in the cultivation rooms 121 and 122 as described above, temperatures, the amount of light, and the supply of feed water should be controlled to be suitable for germination of seeds planted in the pods 10 or cultivation of germinated seeds.

These controls are performed by the controller 21 of the control module 20.

The controller 21 may receive a user operation from the input unit 22. That is, the user may input operations of the plant cultivation apparatus and various commands or information for plant cultivation through the input unit 22.

For example, user operations and commands including power on/off of the plant cultivation apparatus, selection of a cultivation mode, selection of a plant type and state, selection of a cultivation location, input of a current time and an on time, on/off of WiFi, and the like may be received.

In one embodiment, the input unit 2 may be implemented, for example, in the form of a button or a touch pad. In another embodiment, the input unit 22 may be implemented in the form of a touch screen on the display 800. In still another embodiment, the input unit 22 and the display 800 may be formed integrally.

The input unit 22 may include a camera module for photographing an image of a plant in the plant cultivation apparatus or an image of a barcode or a QR code attached to a plant, a pod, a bed, or the like.

The display 800 may visually and/or audibly output a variety of information for operations of the plant cultivation apparatus and plant cultivation. Accordingly, the user may check information output on the display 800 to identify information on the plant cultivation apparatus and the cultivated plant.

The display 800 may include a flat panel display and a speaker to output the information.

In the present embodiment, the display 800 may be integrally provided with the input unit 22 and may be provided with a touch panel for receiving a user's touch input.

The display 800 of the present embodiment may display a user interface (UI) or a graphic user interface (GUI) related to operations of the plant cultivation apparatus.

Specifically, the display 800 may include at least one of a liquid crystal display, a thin film transistor-liquid crystal display, an organic light-emitting diode display, a flexible display, and a three-dimensional display.

In addition, two or more displays may be present depending on the implementation form of the plant cultivation apparatus. For example, one or more displays may be installed in the front portion of the door in the plant cultivation apparatus, or one or more displays may be installed in the interior space such that a user opens the door and operates the displays.

When a touch sensor that detects a touch operation forms a touch screen by forming a mutual layer structure with the display 800, the display may be used as an input device in addition to an output device. The touch sensor may have the form of, for example, a touch film, a touch sheet, or a touch pad.

Further, the touch sensor may be configured to convert changes in pressure applied to a specific portion of the display 800 or capacitance occurring in a specific portion of the display into an electrical input signal.

The touch sensor may be configured to detect not only the position and area of a touched region, but also a pressure at the time of the touch. When there is a touch input to the touch sensor, a signal corresponding thereto may be sent to a touch controller (not shown).

In this embodiment, the display 800 may be implemented integrally with the input unit 22. The input unit 22 may be implemented in the form of a plurality of buttons or a touch pad.

The plurality of buttons may include a power button 801 for selecting on/off of the plant cultivation apparatus, a cultivation mode button 802 for selecting a cultivation mode for a plant to be cultivated, a cultivation location button 803 for selecting a location of upper and lower beds as a location of a plant to be cultivated, a time button 806 for selecting and displaying a current time and an on time (operation time), and an up-down adjustment button 807 for adjusting the current time and the on time up and down and a Wi-Fi button 808 for selecting whether to perform Wi-Fi communication.

For a standard mode, a power saving mode, and a smart mode, cultivation conditions such as a watering amount, a water supply time, a light intensity, a light emitting cycle, a ventilation time, and dehumidification control may be set in advance in each mode, and the operation of the plant cultivation apparatus may be controlled according to the set cultivation conditions.

In particular, in the smart mode, the cultivation conditions may be set differently according to a state and a type of a plant. For example, the cultivation conditions may be set differently depending on whether the plants are in a germination state or the plants are herbs or leafy vegetables, and automatic cultivation may be made according to the set cultivation conditions.

When the Wi-Fi communication is turned on, the plant cultivation apparatus may perform wireless communication with the user's smart device. Accordingly, the user may control the operation of the plant cultivation apparatus according to preset cultivation conditions through his or her smart device at a remote location.

Accordingly, the user may check and set the cultivation conditions, including information on the operation of the plant cultivation apparatus and the cultivation status of the plant through his or her smart device.

In addition, the display 800 may include a time display part 807 for displaying the current time and the on time, and a water tank information display part 808 for displaying whether the water tank 710 is mounted or not and a water level.

In another embodiment, the input unit 22 may select a function using a wireless signal received from an external device. Such an external device may be a portable smart device.

For example, the user may wirelessly connect his portable smart device (e.g., a smart phone) to the plant cultivation apparatus through Wi-Fi communication.

In addition, the input unit 22 may further include a microphone for inputting audio such as a user's speech. The input unit 22 may select a cleaning mode by recognizing a user's speech input through the microphone.

In addition, the plant cultivation apparatus may transmit state information of the plant cultivation apparatus and information and data about the plant to an external device such as a portable smart device through wired/wireless communication.

As an example, when the user selects a monitoring mode in the plant cultivation apparatus, the user may check the state information of the plant and state information of the plant cultivation apparatus through his or her portable smart device.

On the other hand, the controller 21 may receive a residual water detection signal from residual water detection sensors 440 and 742. Accordingly, the controller 21 may perform water supply control using a residual water detection signal detected by the residual water detection sensors 440 and 742.

Particularly, in the present embodiment, the residual water detection sensors 440 and 742 may detect whether residual water is present on the surface of a sensing protrusion 323 formed in the depression 320 of the bed 300.

That is, the residual water detection sensors 440 and 742 detect residual water and transmit a residual water detection signal corresponding to the detection of the residual water to the controller 21 when the residual water is present on the surface of the sensing protrusion 323. When the residual water is absent, the residual water detection sensors 440 and 742 cannot detect the residual water and transmit a residual water detection signal corresponding to non-detection of the residual water to the controller 21.

For example, when the residual water is detected, the residual water detection sensors 440 and 742 may transmit a high signal corresponding to the detection of the residual water to the controller 21. On the contrary, when the residual water is not detected, the residual water detection sensors 440 and 742 may transmit a low signal corresponding to non-detection of the residual water to the controller 21.

In this case, the controller 21 may start water supply by controlling a water supply module 700 when the residual water detection signal corresponding to non-detection of the residual water is received from the residual water detection sensors 440 and 742.

Specifically, the controller 21 may operate the water pump 720 of the water supply module 700 to supply the feed water stored in the water tank 710 to each bed 300. The water pump 720 may be operated by a pump driving part (not shown) such as a motor. Accordingly, the controller 21 may control a pump driving part to operate the water pump 720.

The feed water may be pumped to the water pump 720 through the water supply connection tube 760, and may be selectively supplied to a water reservoir 310 of the bed 300 through the supply hose 730 and the flow path valve 731.

In addition, the controller 21 may detect a flow rate of the feed water supplied by the water pump 720. To this end, in one embodiment, a flow meter (not shown) may be installed at least one position of the water pump 720, the water supply connection tube 760, the supply hose 730, or the flow path valve 731 to detect the flow rate of the feed water. Alternatively, in another embodiment, the flow rate of the feed water may be detected using a rotation speed of the motor. That is, since the flow rate of the pumped feed water is proportional to the rotation speed of the motor, the flow rate of the pumped feed water may be detected using a proportional correlation.

In addition, the controller 21 may receive a mounting detection signal and a water level detection signal from the mounting detection part 741 and a water level detection sensor 745. The mounting detection signal may be a signal for detecting whether the water tank 710 is properly mounted in place, and the water level detection signal may be a signal for detecting a water level of feed water stored in the water tank 710.

Accordingly, when the mounting detection signal is received by the controller 21 by the mounting detection unit 741, the controller 21 may detect that the water tank 710 is installed in a front portion of a bottom space inside the inner case 120 provided due to an upward protrusion portion of the machine chamber 201.

In addition, when the water level detection signal is received by the water level detection sensor 745, the controller 21 may identify that the feed water is stored a predetermined amount or more in the water tank 710.

When it is detected based on the water level detection signal that the water level is below a predetermined threshold level, the controller 21 may display information on the water level through the display 800.

As described above, the controller 21 may perform water supply control in a state in which the mounting detection signal and the water level detection signal are normally received.

In addition, the controller 21 may receive a temperature detection value resulting from detection of a temperature in the cultivation rooms 121 and 122 from the temperature sensor 450, and the controller 21 may adjust an air temperature in the cultivation rooms 121 and 122 by controlling a temperature control module 600 based on the temperature detection value received by the temperature sensor 450.

In addition, the controller 21 may control at least one or more of the lighting modules 401 and 402, the circulation fan assembly 500, the temperature control module 600, and the water supply module 700. A control process will be described in detail below.

Meanwhile, the operation of the plant cultivation apparatus and the control according to plant cultivation by the control module 20 may be performed by a predetermined program or may be selected and specified by a user by manual.

In an embodiment of the present disclosure, it is assumed that control is automatically performed according to a program that is basically set. Of course, the program may be changed depending on a type or cultivation method of each plant.

Then, the control process may be performed by the controller 21 according to information input by operation of the display 800 formed integrally with the input unit 22.

That is, when the user selects a cultivation condition by operating the display 800 in a state in which the bed 300 with the pod 10 installed in the cultivation rooms 121 and 122 is provided, the controller 21 may cultivate a corresponding plant automatically by controlling the temperature control module 600, the circulation fan assembly 500, the lighting modules 401 and 402 and the water supply module 700.

Here, when the operation of the temperature control module 600 is controlled, the refrigeration system including the compressor 610, the condenser 620, and the evaporator 630 and the heat dissipation fan 611 are operated to perform a refrigeration operation.

In particular, when the refrigeration operation is performed, indoor air is sucked into the machine chamber through the inlet 221 of the intake and exhaust grill 220 installed on the open front surface of the machine chamber 201, and air passing through the machine chamber through the outlet 222 of the intake and exhaust grill 220 is discharged. In this case, the indoor air sucked through the inlet 221 is subjected to heat exchange and heat transfer by passing through the condenser 620, the heat sink fan 611 and the compressor 610, and is then discharged to the room through the outlet 222. Details will be described below with reference to FIG. 37.

In addition, the circulation fan 510 constituting the circulation fan assembly 500 is operated during the refrigeration operation.

Accordingly, air present in the rear space in the inner case 120 is supplied into the cultivation rooms 121 and 122 by passing through the circulation fan 510 and at the same time, flows into the cultivation rooms 121 and 122, and then flows into the rear space in the inner case 120 through the lower open portion of the partition wall 530 located at the rear side of the cultivation rooms 121 and 122.

The temperature in the cultivation rooms 121 and 122 may be controlled while repeatedly performing the circulation supplied to the cultivation rooms 121 and 122 by blowing of the circulation fan 510 after being subjected to heat exchange with the evaporator 630 located in the corresponding space.

In particular, while air circulation in the cultivation rooms 121 and 122 is repeatedly performed by the operation of the circulation fan 510, air flowing along the rear spaces of the cultivation rooms 121 and 122 is supplied to the upper spaces in the cultivation rooms 121 and 122 respectively through the circulation fan assemblies 500 after being subjected to heat exchange by passing through the evaporator 630 located in the corresponding space.

Therefore, the air introduced into the cultivation rooms 121 and 122 is maintained at a constant temperature while flowing through the cultivation rooms 121 and 122, whereby the cultivated plant may be cultivated under an optimal temperature condition.

On the other hand, a part of air circulating through the upper cultivation room 121 flows into the lower cultivation room 122 while passing through a gap between the front of the upper bed 300 and the opening/closing door 130, and a part of the air circulating through the lower cultivation room 121 passes through the gap between the front of the lower bed 300 and the opening/closing door 130.

Accordingly, moisture is prevented from being generated on the surface of the opening/closing door 130 by the flow of air passing through the gap. Details will be described below with reference to FIG. 38.

Then, when the cultivation operation is performed, the lighting modules 401 and 402 are operated.

Light source is provided to the plants in the cultivation rooms 121 and 122 in such a way that the LED 421 is periodically turned on/off (or continuously turned on/off) by controlling the operation of the lighting modules 401 and 402.

Of course, even when the LED 421 emits light by the control of the lighting modules 401 and 402, a protective film (not shown) of a transparent window 132 (or a dark-colored transparent window) forming the opening/closing door 130 transmits light of the cultivation rooms 121 and 122 through the room to minimize reflection, thereby minimizing inconvenience to the user in the room.

In addition, when the above-described cultivation operation is performed, the water supply module 700 is operated periodically (or, if necessary).

That is, the controller 21 operates the water pump 720 for each watering cycle when a cultivated plant is determined and a watering cycle is determined. In this case, the controller 21 does not operate the water pump 720 when it is identified through the detection of the mounting detection part 741 that the water tank 710 does not exist.

On the other hand, when the existence of the water tank 710 is identified through a mounting detection signal received by the mounting detection part 741, the controller 21 may operate the water pump 720 to supply the feed water stored in the water tank 710 to each bed 300.

In this case, the feed water is pumped to the water pump 720 through the water supply connection tube 760, and is selectively supplied to the water reservoir 310 of each bed 300 through the supply hose 730 and the flow path valve 731.

Then, the feed water supplied to the water reservoir 310 is provided to the depression 320 in the bed 300 by being guided by the water supply flow path 330 connected to the water reservoir 310.

In this case, since dike portions 33 are formed to protrude from both sides of the water supply flow path 330, the feed water may smoothly flow into the depression 320 along the water supply flow path 330.

In addition, a flow guide groove 302 is formed in a communication portion between the water supply flow path 330 and the depression 320, and when considering that the depression 320 has a track-type structure, the feed water which is guided to the water supply flow path 330 to flow to any one portion of the depression 320 is guided by the flow guide groove 302 and flows from the any one portion of the depression 320 toward the other portion, thus filling the front depression 321 and the rear depressions 322 sequentially. This is as shown in the attached FIG. 36.

The feed water filled in the depression 320 is absorbed by the culture ground 11 of the corresponding pod 10 through the protrusion 16 of each pod 10 installed to contact the feed water in the depression 320 to be supplied to the plant.

In the course of the water supply, the residual water detection sensor 440 or 742 may detect whether the residual water is remaining in the depression 320, and in particular, in the present embodiment, specifically, the residual water detection sensor 440 or 742 may detect whether or not residual water of the feed water is present on the surface of the sensing protrusion 323 of the depression 320.

When the controller 21 receives a residual water detection signal according to detection of the residual water detection or non-detection of residual water by the residual water detection sensors 440 and 742 and determines that the residual water of the feed water is present on the surface of the sensing protrusion 323 of the depression 320, the controller 21 may stop the operation of the water pump 720 to allow the feed water not to be supplied.

The water supply control method using the residual water detection sensors 440 and 742 may be to prevent residual water from remaining in the bed 300. That is, it is possible to prevent the occurrence of residual water due to excessive water supply and occurrence of contamination of residual water by allowing the water of required amount to be supplied.

In particular, when considering that it is needed that the feed water gradually increases as the plant grows, the method according to the embodiment of the present disclosure may supply the more water as the more water is absorbed by corresponding plants, thus achieving proper watering always even when the amount of water to be needed varies when the plants grow.

To this end, in an embodiment of the present disclosure, it is possible to control water supply by identifying the residual water detection signal by the residual water detection sensor and the number of times of water supply. Details will be described again below.

Meanwhile, the water level detection sensor 745 may sense a level of the feed water in the water tank 710 and inform the level to the control module 20. In this process, when the level of the feed water is lower than a set water level, the controller 21 may stop the operation of the water pump 720 and display the fact that the water level is insufficient on the display 800.

As described above, when replenishment of feed water in the water tank 710 is required, the user may open the opening/closing door 130 to expose the water tank 710 to the room, and then take out the water tank 710 to replenish the feed water.

The water tank 710 is taken out by a sliding method. That is, by holding the handle 711 of the water tank 710 and pulling it toward the room, the water tank 710 may be taken out toward the room by being guided by the second guide rail 102 and moved forward.

In this case, the connection pipe 762 of the water supply connection tube 760 may break away from the coupling hole 743 of the installation frame 740 while being separated from the pump connection pipe 721, so that the water supply connection tube 760 is disconnected from the water pump 720. This is as shown in FIGS. 32 and 33 attached.

The water tank 710, which is taken out as described above, may open the opening/closing cover 750 to allow the upper surface thereof to be opened and then replenish the feed water through the opened upper surface.

In this case, when considering that the opening/closing cover 750 is rotatably installed in the water tank 710, the opening/closing cover 750 may be easily opened by lifting bottom surfaces at both sides of a front end of the opening/closing cover 750 (a portion exposed through an incision groove formed in an expansion jaw of the water tank).

Then, when replenishment of the feed water is completed, the water tank 710 is accommodated between the bottom in the cultivation room 121 or 122 and the bottom of the bed 300.

In this case, the water tank 710 is accommodated while slidably moving through the guidance of the second guide rail 102. In this accommodation process, the connection pipe 762 of the water supply connection tube 760 may be connected to the pump connection pipe 721 by passing through the coupling hole 743 of the installation frame 740. This is as shown in FIGS. 30 and 31 attached.

When the accommodation of the water tank 710 is completed, the control module 20 which has identified the accommodation, may allow the water pump 720 to operate at a predetermined cycle, or allow the water pump 720 to operate based on whether residual water is present in each bed 300, which is detected by the residual water detection sensor 440 or 742.

In this case, whether or not the water tank 710 is accommodated may be determined based on whether the contact is in an on state according to the contact of the mounting detection part 741. Of course, when the mounting detection part 741 is a non-contact sensor, it may be identified whether the water tank is adjacent to the installation frame.

In particular, the installation frame 740 may allow the water tank 710 to be accommodated only up to a correct position, thus preventing excessive accommodation.

As a result, the plant cultivation apparatus of the present disclosure may be easily managed in taking out the water tank 710 or replenishing water according to the user's needs because the water tank 710 constituting the water supply module is provided in the cultivation rooms 121 and 122.

On the other hand, in one embodiment according to the present disclosure, the plant cultivation apparatus may set a watering amount and the number of times of water supply for the feed water supplied to the bed 300 in the cultivation room 121 or 122. In a case where water supply is requested in the plant cultivation apparatus, the water supply may be set to proceed at once, or the number of times of water supply may be set such that water supply is performed several times.

In addition, in the plant cultivation apparatus, a total watering amount and a single watering amount may be set during water supply. That is, the total watering amount and the single watering amount may be set in advance with respect to the feed water supplied when water supply is performed at a set time or at a set cycle.

For example, it may be set that a total of 500 ml of feed water is supplied per a day and the feed water of 50 ml is supplied one time. In this case, the total watering amount of water supplied per a day may be 500 ml, and the single watering amount of water supplied one time may be set to 50 ml. When the total watering amount and the single watering amount may be set, the number of times of water supply may be automatically set. In this case, the number of times of water supply may be ten times.

The total watering amount and the single watering amount may be changed as well. For example, it is possible to change the characteristics of the plant cultivation apparatus, that is, a size of the bed 300, a plant to be cultivated, culture ground provided to a pod, and the like.

In this case, the water supply control according to the present embodiment may be performed by the controller 21 based on the detection signal of the residual water detection sensor 742.

Specifically, the controller 21 may receive and store the total watering amount and the single watering amount from a user. That is, the user may input a user operation for the total watering amount and the single watering amount through the input unit 22. Of course, in another embodiment, default information may also be set in the plant cultivation apparatus. In addition, the user may change preset information.

In order to supply water to the bed 300, the residual water detection sensor 440 or 742 may detect whether residual water is present in the bed 300, and transmit a residual water detection signal corresponding to the detection or non-detection of residual water to the controller 21.

The controller 21 may determine whether to supply water according to the residual water detection signal and control necessary components such that water is supplied when water supply is required.

First, when water supply is started, only a predetermined single watering amount is supplied, and then the water supply is temporarily stopped. In this case, when the residual water in the bed 300 is detected by the residual water detection sensor 440 or 742 according to the water supply, waiting may be performed until a plant may absorb the water and the residual water is then not detected in the bed 300. On the contrary, when the residual water in the bed 300 is not detected by the residual water detection sensor 440 or 742 despite the water supply, the water supply is stopped after the water of the single watering amount is supplied once or more.

When the residual water is not detected by the residual water detection sensor 440 or 742 after only the water of the single watering amount is supplied and water supply is stopped, the water of the single watering amount is supplied once again. After waiting for a certain period of time when the residual water is detected, the water of the single watering amount is supplied once again when the residual water is not detected.

This process is repeatedly performed until water is supplied by a preset total watering amount.

On the other hand, in another embodiment, when detection of the residual water is continuously maintained by the residual water detection sensor 440 or 742 while a process of supplying the single watering amount and stopping water supply is repeatedly performed, the water supply may not be performed any more. This is to prevent water supply because the residual water is continuously present in the bed even when the feed water is not supplied as much as the total watering amount.

Thus, the water supply may be repeatedly performed and stopped according to the detection signal for the presence or absence of residual water. That is, when the residual water is detected (detection of residual water), the water supply may be stopped, and when the residual water is not detected (non-detection of residual water), the water supply may be performed. This process may be repeatedly performed until the feed water is supplied as much as the preset total watering amount.

FIG. 40 is a time chart for describing the start and stop of water supply according to an embodiment of the present disclosure.

Referring to the drawings, in the plant cultivation apparatus of this embodiment, water supply to the bed 300 is performed as much as the single watering amount in a state in which the total watering amount and the single watering amount are set in advance.

Here, the start time of the water supply may be determined by various methods. For example, when a set cycle is reached, the water supply may be started, or the water supply may be started at a set time. Alternatively, when the residual water is not detected by the residual water detection sensor 440 or 742 or a time during which the residual water is not detected has elapsed over a set time, water supply may be stated. The start time of the water supply may be changed by the user.

When the first water supply is started as described above, the controller 21 may determine whether the residual water is detected by the residual water detection sensor 440 or 742. When the residual water is not detected, the second water supply may be started in the single watering amount. When the residual water is detected due to the first water supply and waiting is performed until the plant or the culture ground absorbs the water and the residual water is not detected, and when the residual water is not detected, the second water supply may be started.

That is, when the residual water is detected, the detection is continuously performed until the residual water is not detected, and when the residual water is not detected because water is absorbed by the plant or the culture ground, the second water supply is started.

After starting the second water supply as described above, it may be identified whether the residual water is detected, and when the residual water is not detected, a third water supply may be performed again as much as a single watering amount. When the residual water is detected, waiting is performed until the residual water is not detected and then when the residual water is not detected, the third water supply is started.

This process is repeatedly performed until water is supplied as much as a preset total watering amount.

As described above, in the present embodiment, water is supplied each time as much as a preset single watering amount. When the residual water is not detected in the case of detecting the residual water after the water supply is started, the next water supply is started or when the residual water is detected, waiting is performed until the residual water is not detected and when the residual water is not detected, the next water supply is started.

This process may be repeatedly performed until the amount of feed water supplied reaches the total watering amount.

FIG. 40 shows an example in which residual water is detected only after water supply has been performed four times, each time the water of the single watering amount being supplied. The residual water may be detected after the fourth water supply, and when the residual water is not detected again after a certain time has elapsed, the fifth water supply may be performed in the single watering amount. Then, the residual water is detected again, and when the residual water is not detected after waiting is performed a certain period of time, the sixth water supply may be performed again.

In this case, as shown, a water supply interval may increase as the water supply is repeatedly performed. That is, the relationship of t1<t2<t3 may be accomplished. Because the plant and the culture ground absorb water due to the water supply, the rate of water absorption gradually slows down and a residual water remaining time in the bed becomes longer as water supply is repeatedly performed.

Therefore, as the water supply is repeatedly performed, a residual water detection time for which the residual water is detected by the residual water detection sensor 440 or 742 may gradually increase. That is, relationship of S1<S2 may be achieved.

In particular, since the residual water detection sensor 440 or 742 detects the residual water for the first time, the water supply interval and the residual water detection time may increase. That is, until the residual water detection sensor 440 or 742 detects residual water for the first time, the feed water supplied to the bed is immediately absorbed by the plants and the culture ground, so that the residual water is rarely detected. Thereafter, when the plants and the culture ground have sufficiently absorbed water, residual water may remain, and the residual water detection sensor 440 or 742 may detect the residual water for the first time. After that, the rate of water absorption may rapidly decrease, and the residual water remaining time may increase. This is because the water supply interval becomes longer.

On the other hand, in another embodiment, when the feed water supplied to the bed 300 continuously remains and the residual water detection sensor 440 or 742 continuously detects the residual water in the bed 300, the water supply is stopped even though water is not supplied as much as the preset total watering amount.

That is, the above-described water supply process is repeatedly performed until water is supplied as much as the total watering amount. When water is not detected after the water supply is started, water is supplied as much as the single watering amount each time. However, when the feed water is sufficiently supplied and detection of the residual water is continuously maintained, the water supply may not proceed. This means that even though the total watering amount is not supplied, water supply may be stopped.

Of course, as the time passes, the plants need to be watered again and the bed needs to be supplied with water. However, when a time period for setting the total watering amount is short, the water supply may not be performed since the feed water may be supplied sufficiently even when the total watering amount is not supplied.

FIG. 41 is a flowchart for describing a method of controlling water supply in a plant cultivation apparatus according to an embodiment of the present disclosure, FIG. 42 is a flowchart for describing a method of controlling water supply in a plant cultivation apparatus according to another embodiment of the present disclosure, and FIG. 43 is a flowchart for describing a method for controlling water supply in a plant cultivation apparatus according to still another embodiment of the present disclosure.

Referring to FIG. 41, while the plant cultivation apparatus is operating (S101), the controller 21 may receive a residual water detection signal from the residual water detection sensor 440 or 742 for detecting the residual water for each of the plurality of beds 300. Accordingly, the controller 21 may check the residual water in each bed 300 based on the residual water detection signal (S103).

The controller 21 may identify whether there is a bed where residual water is not detected and select a water supply location by identifying a position of the bed where residual water is not detected (S105). That is, this water supply location may be the position of the bed where the residual water is not detected.

Subsequently, the controller 21 may perform water supply to the corresponding bed according to the selected bed location (S107). To this end, the controller 21 may control the operation of the water supply module 700 to supply water to the bed where the residual water is not detected.

Subsequently, the controller 21 may determine whether water supply is completed for all beds in which water supply is needed (S109), and when water supply is not completed for all beds, proceed to step S103 to check the residual water for each bed.

When it is determined that water supply is completed for all beds, the water supply is completed (S111).

FIG. 42 shows a water supply control method according to another embodiment. Since the water supply control method is equally applied to all beds, the water supply control method for a single bend will be described with reference to FIG. 41. Of course, the water supply control method may be applied to water supply control for each of a plurality of beds.

Referring to the drawings, while the plant cultivation apparatus is in operation, the controller 21 may check residual water based on a residual water detection signal received from the residual water detection sensor 440 or 742 that detects the residual water in the bed 300 (S201).

The residual water detection signal may include a residual water detection signal corresponding to detection of the residual water and a residual water detection signal corresponding to non-detection of the residual water.

As a result of checking the residual water of the bed, when the residual water is not detected (S203), the controller 21 may start water supply to a corresponding bed (S205). To this end, the controller 21 may control the operation of the water supply module 700 to supply water to the bed where the residual water is not detected. Specifically, the controller 21 may drive the water pump 720 to pump feed water stored in the water tank 710 and supply the feed water to the bed 300.

Thereafter, the controller 21 may determine whether a first set time has elapsed since the start of the water supply (S207). To this end, the control module 20 may include a timer (not shown) for counting time, and the controller 21 may control the operation of the timer and receive an elapsed time from the timer after a specific time has elapsed.

The controller 21 may continuously supply water until the first set time has elapsed after the start of water supply, and may terminate water supply when the first set time has elapsed (S209). In the present embodiment, for example, the first set time may be set to 20 to 40 seconds, preferably 30 seconds. Of course, the figures are merely examples and may be changed according to the type and condition of plants.

Subsequently, the controller 21 may count the number of times of water supply when the water supply is terminated as described above (S211). That is, the number of times of water supply may be counted every time water supply is started and terminated.

Then, the controller 21 may determine whether detection of the residual water is maintained continuously for a second set time (S213). Specifically, when water supply is started by the control of the controller 21, the feed water may be supplied to the depression 320, and the residual water detection sensor 440 or 742 may determine whether the feed water remains in the depression 320 of the bed 300.

In the present embodiment, the second set time may be determined within a range of 10 minutes to 1 hour, and may be preferably 30 minutes. Of course, the figures are merely examples and may be changed depending on the type and condition of the plant or the condition of the soil contained in the culture ground.

In this way, it is determined whether detection of the residual water is continuously maintained for the second set time after the water supply to the bed is started and the residual water detection sensor 440 or 742 detects that the residual water is present.

On the other hand, as described above, when the water supply is started, there may be a case in which the residual water detection sensor 440 or 742 detects residual water, but detection of the residual water is not continuously maintained. For example, when water supply is started, feed water may be supplied to the depression 320 of the bed 300. The feed water supplied to the depression 320 may be absorbed into the culture ground 11 of the pod 10 and supplied to plants.

In this case, when the culture ground 11 has little water and the culture ground 11 absorbs a lot of water, the amount of the residual water remaining in the depression 320 may be rapidly reduced. As described above, when the amount of feed water remaining in the depression 320 decreases or disappears, the residual water detection sensor 440 or 742 may not detect the residual water on the surface of the sensing protrusion 323 of the depression 320, and thus transmit a residual water detection signal indicating non-detection of residual water to the controller 21.

That is, even though the residual water detection sensor 440 or 742 detects the residual water once, detection of the residual water may not be continuously maintained for a predetermined time (second set time).

Therefore, in the present embodiment, it is possible to determine whether or not to supply water by identifying whether detection of the residual water is continuously maintained for the predetermined time.

The fact that the residual water is continuously detected for the second set time may mean that the feed water required for plant cultivation is sufficiently supplied, and conversely, the fact that detection of the residual water is not continuously maintained for the second set time may mean that water supply is further needed.

Accordingly, the controller 21 may determine that the feed water is sufficiently supplied when detection of the residual water is maintained for the second set time in step S213 to complete the water supply (S217).

When detection of the residual water is not maintained for the second set time (S213), it may be determined whether the counted number of times of water supply has reached a reference number of times (S215). When the number of times of water supply has reached the reference number of times, the water supply is completed (S217), or when the number of times of water supply has not reached the reference number of times, the process proceeds to step S205 to restart water supply.

This is to limit the number of times of water supply because the water supply cannot be restarted indefinitely while detection of the residual water is not maintained for the second set time.

That is, even though detection of the residual water is not continuously maintained for the second set time, the water supply may be completed when the water supply has been performed the reference number of times.

Through the water supply control, feed water required for plant cultivation may be supplied.

Meanwhile, in the present embodiment, a water supply cycle is set in advance, and the controller 21 may perform water supply according to the set water supply cycle. Therefore, the controller 21 is capable of providing feed water to the plants through the above-described water supply control at water supply cycles.

FIG. 43 shows a water supply control method according to still another embodiment.

As described above, since the water supply control method according to the present embodiment is equally applied to all beds, the water supply control method for a single bend will be described with reference to FIG. 43. Of course, the water supply control method may be applied to water supply control for each of a plurality of beds.

In the present embodiment, a total watering amount and a single watering amount according to the water supply can be set in the plant cultivation apparatus (S301). Specifically, the total watering amount of feed water to be supplied at every set time or a set cycle, that is, the total watering amount, and the amount of the feed water in the case of water supply one time, that is, the single watering amount may be set in advance.

As an example, when it is set to supply a total of 500 ml of feed water per day and to supply 50 ml of water at single water supply, the total amount of feed water supplied per day is 100 ml, and the single watering amount is set to 50 ml. Naturally, the total watering amount and the single watering amount may be changed.

As in the above example, when it is set that the water of total 500 ml is supplied in one day, but the water of 50 ml is supplied at one time, water supply may be performed a total of ten times.

When the request to start water supply is input (S303), the controller 21 may start water supply according to the input request to start water supply (S305).

The request to start water supply may be made in various ways as described above. For example, water supply may be requested at a set time, water supply may be requested at every set period, or when the residual water is not detected or the time for which the residual water is not detected continues for a predetermined time or more, water supply may be requested.

In addition, the start of the water supply may mean that the supply of the feed water to the bed 300 is started, and the supply of the feed water may be made by the operation of the water pump 720 under the control of the controller 21 as described above.

When water supply is started, feed water is supplied until the set single watering amount is reached. Accordingly, the controller 21 may determine whether the amount of feed water supplied has reached the single watering amount after the start of water supply (S307).

When it is determined that the amount of feed water supplied has reached the single watering amount, the water supply is stopped (S309).

Then, the controller 21 may determine whether the residual water is detected by the residual water detection sensor 4400 or 742 (S311). When the residual water is detected by the residual water detection sensor 440 or 742, the residual water is continuously detected until the residual water is not detected, or when the residual water is not detected, it is determined whether the amount of feed water supplied due to water supply until now has reached the set total watering amount (S313).

When the residual water is first detected by the residual water detection sensor 440 or 742, water is absorbed by the plants and the culture ground, and when some time elapses after the residual water is detected, the residual water is not detected.

When water is supplied as much as the total watering amount in S313, the water supply is completed (S315), or when water is not supplied as much as the total watering amount, the process proceeds to step S305 again to start water supply.

This process is repeatedly performed until water has been supplied as much as the total water amount.

In this way, in the present disclosure, the total watering amount of feed water to be supplied for a set period and the single watering amount may be set. The water may be supplied as much as the single watering amount each time, and when the total watering amount is reached, water supply may be completed. Every single water supply may be performed according to whether residual water is detected in the bed.

As described above, the plant cultivation apparatus according to the embodiment of the present disclosure may cultivate a plant in the room, and for this purpose, perform control suitable for various cultivation conditions to enable plant cultivation.

To this end, the plant cultivation apparatus according to the present disclosure may be configured such that the water tank 710 constituting the water supply module 700 is configured as the forward drawable manner, and thus easily maintain the water tank 710 when being installed in a specific narrow space such as a built-in method.

In addition, the plant cultivation apparatus of the present disclosure is operated to supply the feed water while the water supply module 700 is operated in cooperation with the residual water detection sensor 440 or 742 for each bed 300, so that only the proper amount of moisture supplied to plants may be always supplied, thus preventing the occurrence of residual water.

Further, the plant cultivation apparatus of the present disclosure may be configured as the non-circulating structure in which the feed water is normally stored in the separate water tank 710, which is blocked from the outside environment, and is supplied to the bed only when necessary. Thus, contamination of the feed water in the water tank 710 may be prevented.

In addition, the plant cultivation apparatus of the present disclosure may be configured such that the water tank 710 in which the feed water is stored is easily drawable, thereby improving user convenience.

In addition, in the plant cultivation apparatus of the present disclosure, the water tank 710 and the water pump 720 may be always seated at correct positions by the installation frame 740.

In addition, the plant cultivation apparatus of the present disclosure, the water supply module 700 is provided between the bottom of the cultivation room 121 or 122 and the bed 300 in the cultivation room 121 or 122, thus securing the maximum cultivation space for the cultivation room 121 or 122.

In addition, since the plant cultivation apparatus of the present disclosure is configured to open and close the open top of the water tank 710 with the opening/closing cover 750, it is possible to prevent contamination of feed water in the water tank 710.

In addition, in the plant cultivation apparatus of the present disclosure, the opening/closing cover 750 is rotatably installed in the water tank 710, making it easy to open and close the water tank 710.

In addition, the plant cultivation apparatus of the present disclosure may maximize the water storage amount of the water tank 710 because the water supply connection tube 760 is provided in the opening/closing cover 750.

In addition, in the plant cultivation apparatus of the present disclosure, the opening/closing cover 750 may include the cover window 752, thus allowing a user to accurately recognize a water level of the feed water in the water tank 710 even with the user's naked eyes.

In addition, the plant cultivation apparatus of the present disclosure may prevent contamination of the feed water inside the water tank because the surrounding frame 753 is formed on the opening/closing cover 750.

In addition, the plant cultivation apparatus of the present disclosure may accurately detect whether or not the water tank is mounted because the mounting detection unit is provided on the installation frame.

In addition, according to the plant cultivation apparatus of the present disclosure, the upper surface frame is provided at the upper end of the installation frame, and the upper surface frame is equipped with the residual water detection sensor that detects whether the feed water supplied to the bed remains, thus accurately detecting whether the residual water is present in the bed.

The embodiments of the present disclosure have been described above with reference to the accompanying drawings, but the present disclosure is not limited to the above embodiments and may be manufactured in various different forms, and it is understood that those skilled in the art to which the present invention pertains may implement the present invention in other specific forms without changing the technical spirit or essential features thereof. Therefore, it should be understood that the embodiments described above are illustrative in all respects and not restrictive.

The invention claimed is:

1. A plant cultivation apparatus comprising:
   a cabinet defining a cultivation space accommodating at least one bed, plants being cultivated in the cultivation space;
   a door for opening and closing the cultivation space;
   a liquid supply module provided in the cultivation space to supply feed liquid to the bed;
   a residual liquid detection sensor configured to detect whether residual liquid of the feed liquid supplied to the bed is present; and
   a controller configured to control the liquid supply module based on whether residual liquid of the feed liquid supplied to the bed is present,
   wherein the bed has a depression which is formed to be recessed from an inner bottom of the bed to receive and store the feed liquid from the liquid supply module, and
   wherein the bed is formed with a sensing protrusion which protrudes from a bottom surface of the depression, the sensing protrusion having an upper surface positioned higher than the bottom surface of the depression and lower than a bottom surface of the bed, and
   wherein the residual liquid detection sensor is disposed below the sensing protrusion and detects whether residual liquid on the sensing protrusion is present.

2. The plant cultivation apparatus of claim 1, wherein the residual liquid detection sensor detects whether residual liquid is present on the upper surface of the sensing protrusion.

3. The plant cultivation apparatus of claim 2, wherein the residual liquid detection sensor transmits a residual liquid detection signal to the controller to indicate whether residual liquid is present on the upper surface of the sensing protrusion.

4. The plant cultivation apparatus of claim 3, wherein the controller controls the liquid supply module such that feed liquid is supplied to the depression when the residual liquid detection signal from the residual liquid detection sensor indicates that residual liquid is not present on the upper surface of the sensing protrusion.

5. A liquid supply control method for a plant cultivation apparatus, comprising:
   providing the plant cultivation apparatus of claim 1;
   setting a total liquid amount for a set time and a single liquid amount;
   starting, bya controller, a supply of liquid to the bed;
   stopping the supply of liquid when the single liquid amount is supplied tothe bed;
   detecting, by the residual liquid detection sensor, whether residual liquid is present in the bed;
   determining whether to supply additional liquid to the bed based on whether residual water is detected and whether a total amount of liquid supplied has reached the total liquid amount; and
   repeatedly supplying the single liquid amount of the liquid to the bed when residual water is not detected until a total amount of liquid supplied during the set time has reached the total liquid amount.

6. The liquid supply control method of claim 5, wherein a time interval between supplying liquid to the bed increases as the supplying of the liquid is repeatedly performed.

7. The liquid supply control method of claim 6, wherein a time interval at which the residual liquid is detected by the residual liquid detection sensor increases as the supplying of the liquid is repeatedly performed.

8. The liquid supply control method of claim 5, wherein no additional liquid is supplied to the bed during the set time when the total amount of liquid supplied has reached the total liquid amount.

* * * * *